United States Patent
Toyama et al.

(10) Patent No.: US 7,088,460 B2
(45) Date of Patent: Aug. 8, 2006

(54) IMAGE FORMING APPARATUS HAVING A DISPLAY CHANGEABLE IN COLOR ACCORDING TO OPERATIONAL MODE

(75) Inventors: Masami Toyama, Toyokawa (JP); Motomi Takemoto, Toyokawa (JP); Akinori Yoshida, Nishio (JP); Hiroaki Ikeda, Toyokawa (JP); Tomokazu Kato, Toyokawa (JP); Junko Natsume, Aichi-Ken (JP)

(73) Assignee: Minolta Co., Ltd., Osaka (JP)

( * ) Notice: Subject to any disclaimer, the term of this patent is extended or adjusted under 35 U.S.C. 154(b) by 1018 days.

(21) Appl. No.: 09/160,267

(22) Filed: Sep. 24, 1998

(65) Prior Publication Data

US 2002/0030838 A1    Mar. 14, 2002

(30) Foreign Application Priority Data

Sep. 26, 1997 (JP) ................................. 9-261582
Oct. 16, 1997 (JP) ................................. 9-283625
Oct. 16, 1997 (JP) ................................. 9-283627

(51) Int. Cl.
*G06F 13/00* (2006.01)
*G06F 3/12* (2006.01)

(52) U.S. Cl. .................... 358/1.14; 358/1.18
(58) Field of Classification Search ........ 358/1.1–1.18; 399/21, 81; 345/559, 593, 597, 600, 619, 345/533, 581, 589, 591
See application file for complete search history.

(56) References Cited

U.S. PATENT DOCUMENTS

| | | | |
|---|---|---|---|
| 4,260,878 A | | 4/1981 | Kawamura et al. ....... 235/92 AC |
| 5,602,625 A | * | 2/1997 | Okamoto et al. ............ 399/21 |
| 5,649,244 A | * | 7/1997 | Sato et al. .................. 396/287 |
| 5,929,862 A | * | 7/1999 | Barkans ...................... 345/431 |
| 5,987,535 A | * | 11/1999 | Knodt et al. ................. 710/15 |
| 5,999,708 A | * | 12/1999 | Kajita ......................... 395/114 |

FOREIGN PATENT DOCUMENTS

| | | |
|---|---|---|
| JP | 1-267568 A | 10/1989 |
| JP | 05-130441 A | 5/1993 |
| JP | 07-319366 A | 12/1995 |
| JP | 09-114627 A | 5/1997 |
| JP | 09-198191 A | 7/1997 |
| JP | 10-105001 A | 4/1998 |

* cited by examiner

*Primary Examiner*—Douglas Q. Tran
(74) *Attorney, Agent, or Firm*—Sidley Austin LLP

(57) ABSTRACT

An image forming apparatus has an image forming section for forming an image in a plurality of operational modes and a display device for executing display in a plurality of colors. Color information corresponding to the plurality of operational modes is stored in a memory. A CPU reads color information corresponding to an operational mode to be executed from the memory and controls the color to be displayed on the display device.

31 Claims, 37 Drawing Sheets

Fig.5

| COLOR VALUE | R | G | B |
|---|---|---|---|
| 1 | 0 | 0 | 8 |
| 2 | 0 | 8 | 8 |
| 3 | 8 | 8 | 8 |
| .. | .. | .. | .. |
| 64 | 128 | 128 | 128 |
| .. | .. | .. | .. |
| 127 | 255 | 255 | 255 |

Fig. 17

| SETTING BY USER | AUTO-SETTING 1 | AUTO-SETTING 2 | AUTO-SETTING 3 |
|---|---|---|---|
| NUMBER OF COPIES>1 | SORT | | |
| BOOK MODE | CENTER ERASE | PAPER A4 LENGTHWISE | UPPER BINDING MARGIN |
| 2 IN 1 COPY | MAGNIFICATION×0.707 | .. | .. |
| .. | .. | .. | .. |

Fig.18

| COPY MODE-SETTING CAUSE | CODE VALUE | COLOR VALUE |
|---|---|---|
| UNSET | 0 | 3 |
| SET BY USER | 1 | 16 |
| AUTOMATICALLY SET | 2 | 64 |

Fig.19

| COPY MODE | VALUE OR ON/OFF | SETTING CAUSE (CODE VALUE) |
|---|---|---|
| NUMBER OF COPIES | 2 | 1 |
| PAPER | A4 | 0 |
| MAGNIFICATION | ×1.000 | 0 |
| DENSITY | AUTO | 0 |
| FINISH | SORT | 2 |
| COPY FORM | SINGLE SIDE→ SINGLE SIDE | 0 |
| ⋮ | ⋮ | ⋮ |
| FREE REGISTRATION | OFF | 0 |
| MIXED DOCUMENT PLACING | ON | 0 |

Fig.29

| CLASSIFICATION | COPY MODE | VALUE OR ON/OFF | SET/UNSET (FLAG Set) |
|---|---|---|---|
| BASIC | NUMBER OF COPIES | 2 | 1 |
| BASIC | PAPER | A4 | 0 |
| BASIC | MAGNIFICATION | ×1.000 | 0 |
| BASIC | DENSITY | AUTO | 0 |
| BASIC | FINISH | SORT | 1 |
| BASIC | COPY FORM | SINGLE SIDE→SINGLE SIDE | 0 |
| ... | ... | ... | ... |
| APPLIED | FREE REGISTRATION | OFF | 0 |
| APPLIED | MIXED DOCUMENT PLACING | ON | 0 |

Fig.30

| COPY MODE - SET STATE | VARIABLE Mode | COLOR VALUE |
|---|---|---|
| INITIAL STATE | 0 | 3 |
| BASIC FUNCTION - SET STATE | 1 | 16 |
| APPLIED FUNCTION - SET STATE | 2 | 64 |

Fig.37

| COPY MODE - SET STATE | VARIABLE Mode | COLOR VALUE |
|---|---|---|
| PROGRAM - UNCALLED STATE | 0 | 3 |
| PROGRAM 1 - CALLED STATE | 1 | 16 |
| PROGRAM 2 - CALLED STATE | 2 | 64 |
| PROGRAM 3 - CALLED STATE | 3 | 127 |

Fig.40

| COPY MODE - SET STATE | VARIABLE Mode | COLOR VALUE |
|---|---|---|
| INITIAL STATE | 0 | 3 |
| PROGRAM 1 - CALLED STATE | 1 | 16 |
| PROGRAM 2 - CALLED STATE | 2 | 32 |
| PROGRAM 3 - CALLED STATE | 3 | 64 |
| PROGRAM - UNCALLED AND APPLIED FUNCTION-SET STATE | 4 | 96 |
| PROGRAM - UNCALLED AND BASIC FUNCTION-SET STATE | 5 | 127 |

IMAGE FORMING APPARATUS HAVING A DISPLAY CHANGEABLE IN COLOR ACCORDING TO OPERATIONAL MODE

This application is based on application(s) Nos. 9-261582, 9-283625 and 9-283627 filed in Japan, the contents of which are hereby incorporated by reference.

BACKGROUND OF THE INVENTION

The present invention relates to an image forming apparatus embodied as, e.g., a copying machine, a facsimile (FAX) apparatus, a printer or a composite apparatus having two or all of a copying function, a facsimile function, and a printing function.

Recently, copying machines in which copy modes (i.e., copying conditions), such as the number of copies, are manageable for each of different people and departments using the copying machine are in wide use. In such a copying machine, identification information such as an ID number or a password is registered. A user can be allowed to use the copying machine when the user enters through an operation panel of the machine or from an external apparatus the same identification information as that registered.

Further, there are also widely spread multi-job type copying machines which accept a plurality of jobs and execute the jobs sequentially. In this specification the term "job" refers to a series of operations including input of image signals, development, transfer of an image to copying paper, and delivery of copying paper. In the copying machine of this type, when a job is accepted, an ID number is allotted to the job. Then, the user is allowed to cancel or alter the job by inputting the ID number to the machine.

The copying machine of each of the above two types is adapted to display identification information such as a department code specifying a department using the machines, an ID number of a user, or a job number indicating a job in execution, on a screen of the operation panel or the main body of the machine to meet the convenience of the user.

However, a large number of characters and numerals indicating set information, status of the copying machine, and the like are required to be displayed on the screen having a limited display space. Thus, it is difficult to secure a space for displaying the department code, the ID number, and/or the job number in the screen. Even though the screen has such a display space, the department code, the ID number, and/or the job number are arranged along with much other information on the screen. Therefore, it is difficult for people not accustomed to operating the copying machine to readily find where information of the department or the job is displayed on the screen.

Composite apparatuses having two or more of a copying function, a facsimile function, and a printer function are also in wide use. FIGS. 42A and 42B show an operational panel of a composite apparatus of this type. The operation panel 905 is shown having a start key 911 for starting an operation, a stop key 912 for stopping the operation, a reset key 913 for initializing the screen or a set mode, a numeric keypad (ten key pad) 914 for inputting numeric information such as the number of copies, telephone numbers, and the like, and a clear key 915 for clearing input numerals. The operation panel 905 is further provided with a function switching key 920 for switching the copying function to the facsimile function, and vice versa. The function switching key 920 incorporates an LED (light emitting diode) 921. When the function switching key 920 is turned off and the copying function is selected, the LED 921 does not emit light, as shown in FIG. 42A. On the other hand, when the function switching key 920 is turned on and the facsimile function is selected, the LED 921 emits light, as shown in FIG. 42B. Accordingly, by looking at the LED 921, the user can recognize which of the copying function and the facsimile function has been selected.

However, people not accustomed to operating the composite apparatus are likely to be unaware of the LED 921, thus having difficulty in finding the selected function.

Meanwhile, to obtain a desired copy output, recent copying machines have a large number of copy modes (image-forming conditions) which can be set by a user. The copy modes are classified into two groups: 1) basic function-related copy modes such as the number of copies, paper size, copying magnification, density, and the like and 2) applied function-related copy modes such as free registration, mixed document placing (mixture of different document sizes), and the like. On the other hand, in view of cost, the size of a display screen of the operation panel of the copying machine is not so large as to cope with the increase in number of the copy modes. Thus, it is difficult for a user to intuitively know which of the basic function-related copy modes and the applied function-related copy modes have been set or whether neither the basic function-related copy modes nor the applied function-related copy modes have been set or not.

Due to the increased number of copy modes as described above, a known copying machine has a programming function. That is, the copying machine is adapted to store a plurality of different programs incorporating value-set copy modes. A user calls a desired copy mode by pressing a program memory key to immediately place the machine in the state that the copy modes written to the program have been set. However, the existing copying machine is not designed so that the user can intuitively know which of the programs has been called.

Further, in copying machines having many copy modes, various devices are made to obtain an optimum copy output by using the copy modes. For example, when a copy mode is set by the user, another copy mode is automatically set where necessary. However, again, the existing machines are not designed such that the user readily know the presence and contents of a copy mode set automatically in relation to a copy mode set by the user.

SUMMARY OF THE INVENTION

Therefore, a primary object of the present invention is to provide an image forming apparatus which allows an user to readily know in what operational mode or condition the apparatus is currently placed even though the user is not accustomed to operating the apparatus.

Another object of the present invention is to provide an image forming apparatus capable of displaying various pieces of information including user identification information without requiring an increase of the display space.

In order to accomplish the above objects, the present invention provides an image forming apparatus including:

an image forming section for forming an image in a plurality of operational modes;

a display device for executing display in a plurality of colors;

a memory which stores color information corresponding to the plurality of operational modes; and control means for reading color information corresponding to an operational mode to be executed from said memory to control the color to be displayed on said display device.

According to another aspect of the present invention, there is also provided an image forming apparatus including:

an image forming section for forming an image in a plurality of operational modes;

a display device for performing display in a plurality of display modes;

a memory which stores display mode information corresponding to said plurality of operational modes; and control means for reading display mode information corresponding to an operational mode to be executed from said memory to control the display mode of said display device.

Other objects and features of the present invention will be apparent from the following description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 5 is a diagram showing color values and values of each of components R, G, and B corresponding to the color values stored in a color palette;

FIG. 17 shows a table for associating a copy mode set by a user with a copy mode automatically set based thereon;

FIG. 18 shows a table for associating the cause (indicated by a code value) for setting of a copy mode with a color value indicating a color which is to be displayed on a screen of a liquid crystal display device;

FIG. 19 shows a table for associating a set copy mode with a code value indicating the cause for setting of the copy mode;

FIG. 29 shows a table indicating a set copy mode state;

FIG. 30 shows an example of a table for associating a copy mode setting state with a color value;

FIG. 37 shows a table for associating a set copy mode state with a color value according to the fifth embodiment;

FIG. 40 shows a table for associating a set copy mode state with a color value according to a sixth embodiment of the present invention;

DETAILED DESCRIPTION OF THE PREFERRED EMBODIMENTS

First Embodiment

Figure 1:
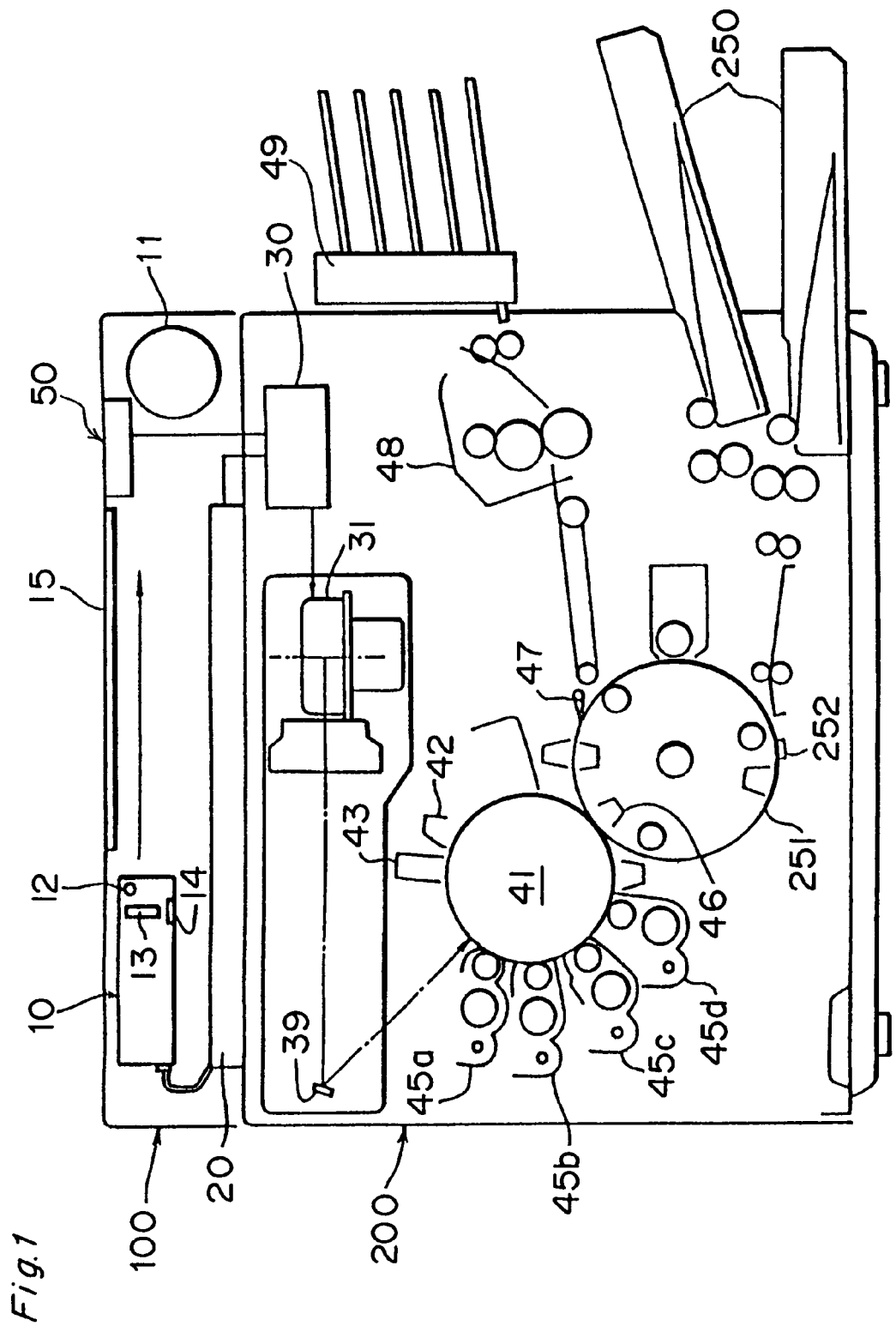
FIG. 1 is a schematic sectional view of a digital color copying machine according to an embodiment of the present invention.

FIG. 1 is a schematic sectional view showing a digital color copying machine according to a first embodiment of the present invention.

The digital color copying machine is comprised of an image reading section 100 for reading an image of a document and an image forming section 200 reproducing the image read by the image reading section 100.

A scanner 10 in the image reading section 100 has an exposure lamp 12 for irradiating a document, a rod lens array 13 for condensing light reflected by the document, and a contact type CCD color image sensor 14 for converting condensed light into electric signals. When the document is read, the scanner 10 is driven by a motor 11 and moves in a direction (sub-scanning direction) shown by an arrow, thus scanning the document placed on a platen 15. The image of the document exposed to the exposure lamp 12 is photoelectrically converted by the image sensor 14. Multi-valued electric signals of the three colors of R, G, and B obtained by the image sensor 14 are converted into 8-bit gradation data of yellow (Y), magenta (M), cyan (C), or black (Bk) by a read signal processing portion 20. The 8-bit gradation data determined by the read signal processing portion 20 are stored in a synchronizing buffer (a FIFO memory) 30. An operation panel section 50 is provided alongside the platen 15. The operation panel section 50 is connected with a print head portion 31 by means of a control line. According to a copy mode set by a user, the print head portion 31 controls each motor provided inside the copying machine and also controls the emission intensity of a semiconductor laser.

In the image forming section 200, the print head portion 31 controlling the entire copying processing makes a predetermined gradation correction (γ correction) to the 8-bit gradation data received from the buffer 30. Then, the print head portion 31 makes a D/A conversion of the corrected image data to generate a laser diode driving signal, and modulates the semiconductor laser at an emission intensity based on the laser diode driving signal. Laser beams emitted from the print head portion 31 reach a rotary photosensitive drum 41 via a reflector 39. Before being exposed to the laser beams for every one copying operation, the photosensitive drum 41 is irradiated with an eraser lamp 42 and electrified uniformly by an electric charger 43. When the photosensitive drum 41 is exposed in this state, an electrostatic latent image of the document is formed on the photosensitive drum 41. One of toner developing units 45a, 45b, 45c and 45d of cyan, magenta, yellow, and black is selected to develop the electrostatic latent image formed on the photosensitive drum 41. A developed toner image is transferred by a transfer charger 46 to a sheet of paper wound around a transfer drum 251.

The printing process is carried out repeatedly for the four colors of yellow (Y), magenta (M), cyan (C), and black (Bk). At this time, synchronously with the operation of the photosensitive drum 41 and the transfer drum 251, the scanner 10 repeats a scanning operation. Thereafter, the paper is separated from the transfer drum 251 by actuating a separation pawl 47. The separated paper is fixed while it is passing through a fixing device 48, and then delivered to a staple sorter 49. The staple sorter 49 discharges the paper in a paper delivery mode set through the operation panel section 50. There are three paper delivery modes: a mode of continuously delivering sheets of copy paper to only a single delivery tray, a gathering mode of delivering a same page of copy paper to each of a plurality of delivery trays, and a stack mode of delivering a plurality of sheets of copy paper of a same page to a same delivery tray. Copy paper of an appropriate size is fed from one of paper cassettes 250. The thus fed copy paper is gripped at a top thereof by a chucking mechanism 252 such that the paper is not displaced during the transfer.

Figure 2:
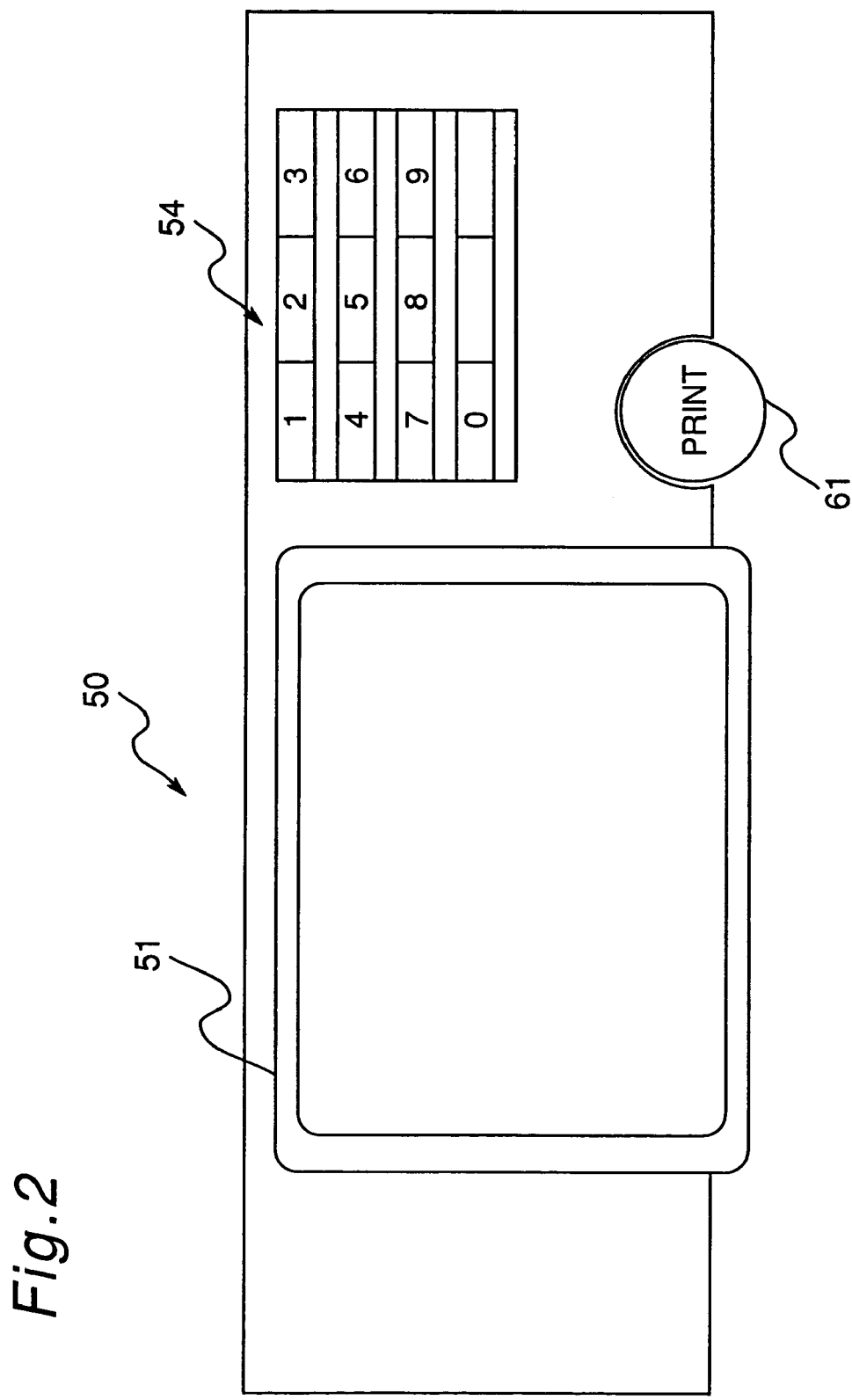
FIG. 2 is a front view showing a panel surface of an operation panel section of the copying machine shown in FIG. 1.

FIG. 2 is a front view of the surface of the operation panel section 50. On the surface of the operation panel section 50, there are provided a numeric keypad 54 for directly setting the number of copy papers and a copying magnification, a print key 61 for instructing start of a copying operation, and a color liquid crystal display unit 51. The color liquid crystal display unit 51 is of a so-called touch panel type and comprises a color liquid crystal display device 52 shown in FIG. 3 and a transparent touch switch 53 provided on the color liquid crystal display device 52. The user can recognize a key input screen displayed on the color liquid crystal display device 52 through the transparent touch switch 53 without parallax.

Figure 3:
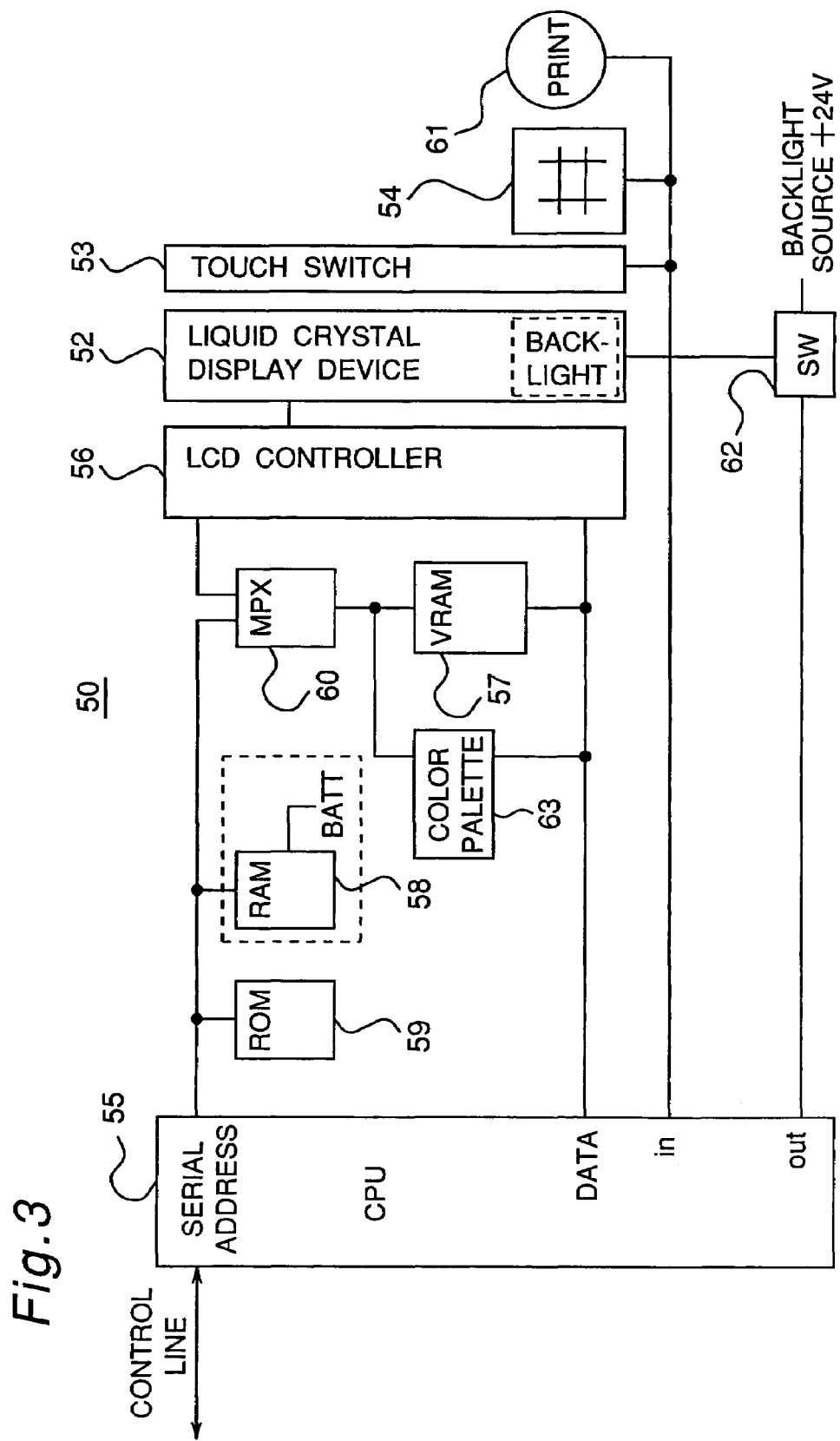
FIG. 3 is a block diagram showing a control system for the operation panel section of the copying machine.

FIG. 3 is a block diagram showing the construction of the control system of the operation panel section 50. A CPU (microcomputer) 55 controls the entire operation panel section 50 and transmits, through the control line, copying conditions set by the user and an instruction of start of a printing operation to the print head portion 31 shown in FIG. 1. A ROM 59 stores a program of display control processing (described later) which is executed by the operation panel section 50. A RAM 58 has a backup battery, and the RAM 58 temporarily stores a copy mode set by the user and various data such as color values indicating the background color of the screen of the color liquid crystal display device 52. A VRAM 57 stores data of various key input screens to be displayed on the color liquid crystal display device 52.

A color palette 63 stores the relationship between color values indicating the background color of the screen of the color liquid crystal display device 52 and the value of each of the components R (red), G (green), and B (blue), as shown in FIG. 5. The color value ranges from 1 to 127. The value of each of the components R, G, and B is set in the range of 0–255 for each color value. For example, a color value 1 indicates pale blue because the component R has a value of 0, the component G has a value of 0, and the component B has a value of 8. A color value 127 indicates the darkest black because the component R has a value of 255, the component G also has a value of 255, and the component B also has a value of 255.

An MPX (multiplexer) 60 shown in FIG. 3 synthesizes data of the key input screen read from the VRAM 57, the value of each of the components R, G, and B read from the color palette 63, and data of a copying condition (for example, number of copies and copying magnification) read from the RAM 58 with each other, and supplies the thus synthesized data to an LCD controller 56. The LCD controller 56 supplies the data to the color liquid crystal display device 52, based on data transmitted thereto from the CPU 55.

Figure 4:
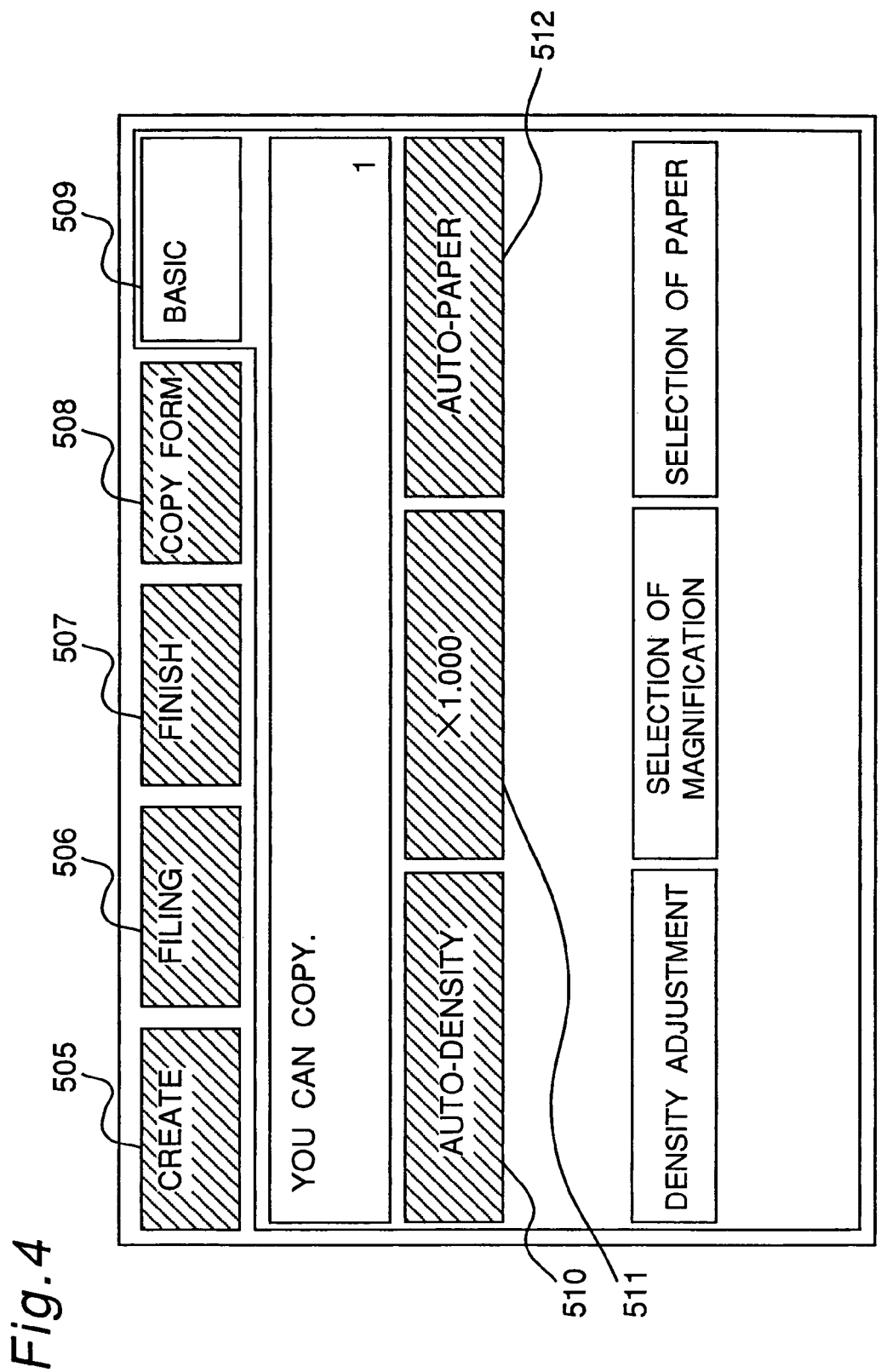
FIG. 4 is a view showing an example of a screen of a liquid crystal display device in the operation panel section of the first embodiment.

The color liquid crystal display device 52 provided with a backlight which is turned on and off by a switch 62 displays the key input screen, based on control signals transmitted from the LCD controller 56. For example, referring to FIG. 4, the user touches a key 505, 506, 507, 508, 509, 510, 511, or 512 displayed on the key input screen through the touch switch 53, thus depressing the touch switch 53. The touch switch 53 consists of a plurality of switches, and transmits data representing the position of the switch depressed by the user to the CPU 55. The CPU 55 recognizes the key depressed by the user, based on the position data transmitted from the touch switch 53 and a screen being presently displayed. The CPU 55 transmits control signals to the RAM 58, the VRAM 57, and the LCD controller 56 in correspondence to the contents of the recognized key, thus rewriting the screen data. Thus, by depressing the keys 505–512, the user can change the screen, set a copy mode, and set a department or section which uses the copying machine. Further, when a department using the copying machine becomes definite or a job is switched to another by the input operation of the touch switch 53, the CPU 55 transmits control signals to the color palette 63 and the LCD controller 56, based on color values of the background color, stored in the RAM 58, corresponding to the job and the department which use the copying machine, to thereby rewrite data of the background color of the screen.

Figure 6:
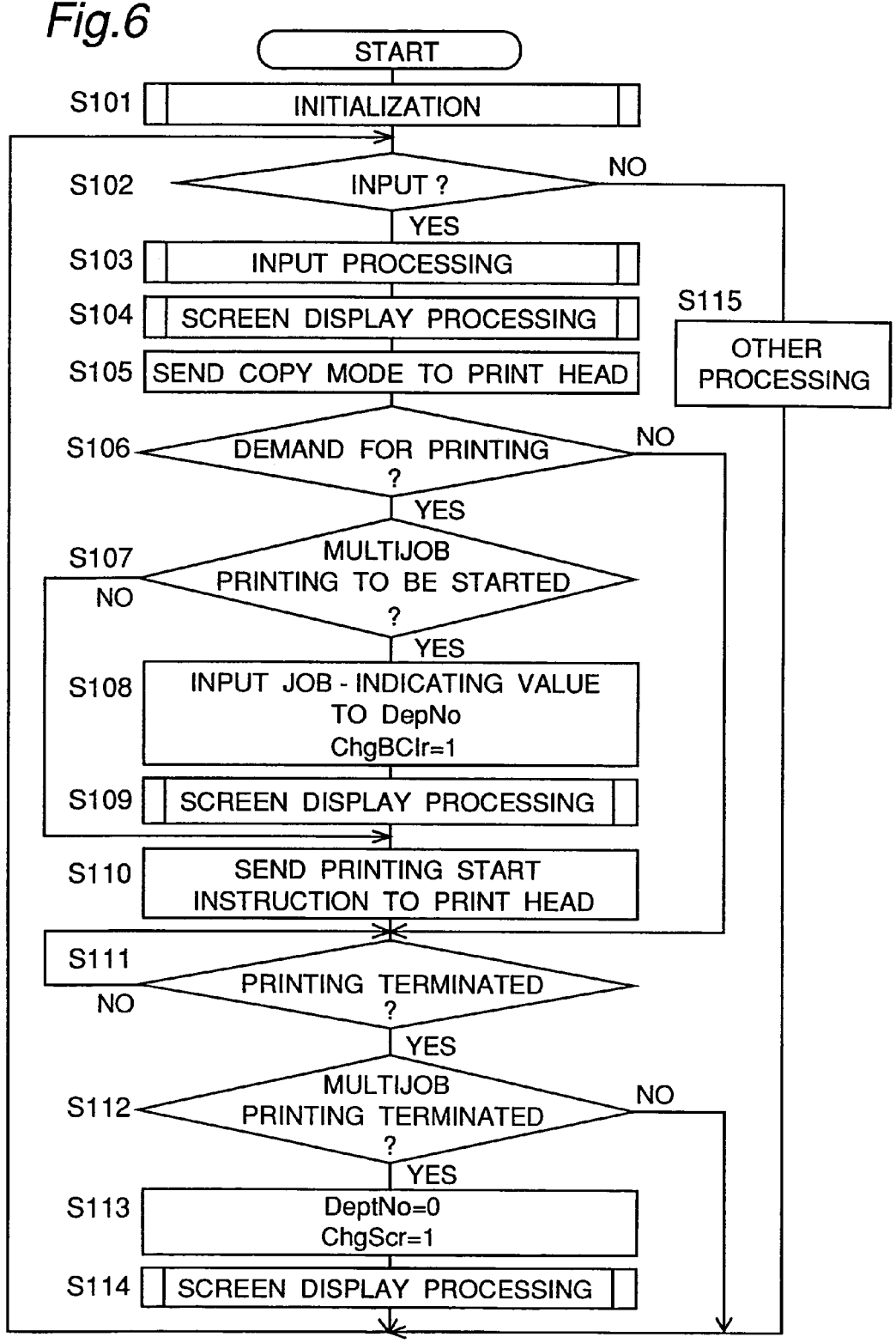
FIG. 6 is a chart showing a main flow of a processing which is executed by a CPU in the operation panel section of the first embodiment.

FIG. 6 shows a main routine of display control processing which is executed by the CPU 55.

In the display control processing, three kinds of flags DeptNo, ChgScr, and ChgBClr are used.

The flag DeptNo indicates a department or division using the copying machine or a job being performed. More specifically, if the flag DeptNo is set to a value of "0", the flag indicates that the department using the copying machine or the job is not definite. If the flag DeptNo is set to an integer 1 or larger, the integer corresponds to a specified department using the copying machine or a specified job and to a color value stored in the color palette 63. In the embodiment, the integers set on the flag DeptNo are associated with color values equal to the integers in one-to-one correspondence. For example, a value "1" set on the flag DeptNo corresponds to a color value "1", and a value "2" set on the flag DeptNo corresponds to a color value "2".

The flag ChgScr indicates whether the screen data should be rewritten or not. More specifically, the flag ChgScr set to a value "0" indicates that the screen data should not be rewritten, and the flag ChgScr set to a value "1" indicates that the screen data should be rewritten.

The flag ChgBClr indicates whether the background color of the screen should be changed or not. More specifically, the flag ChgBClr set to a value "0" indicates that the background color of the screen should not be changed, and the flag ChgBClr set to a value "1" indicates that the background color of the screen should be changed.

The display control processing is now described.

(1) When the copying machine is powered on, the CPU 55 executes a processing of initializing the copy modes, the flags, etc. (S101).

Figure 7:
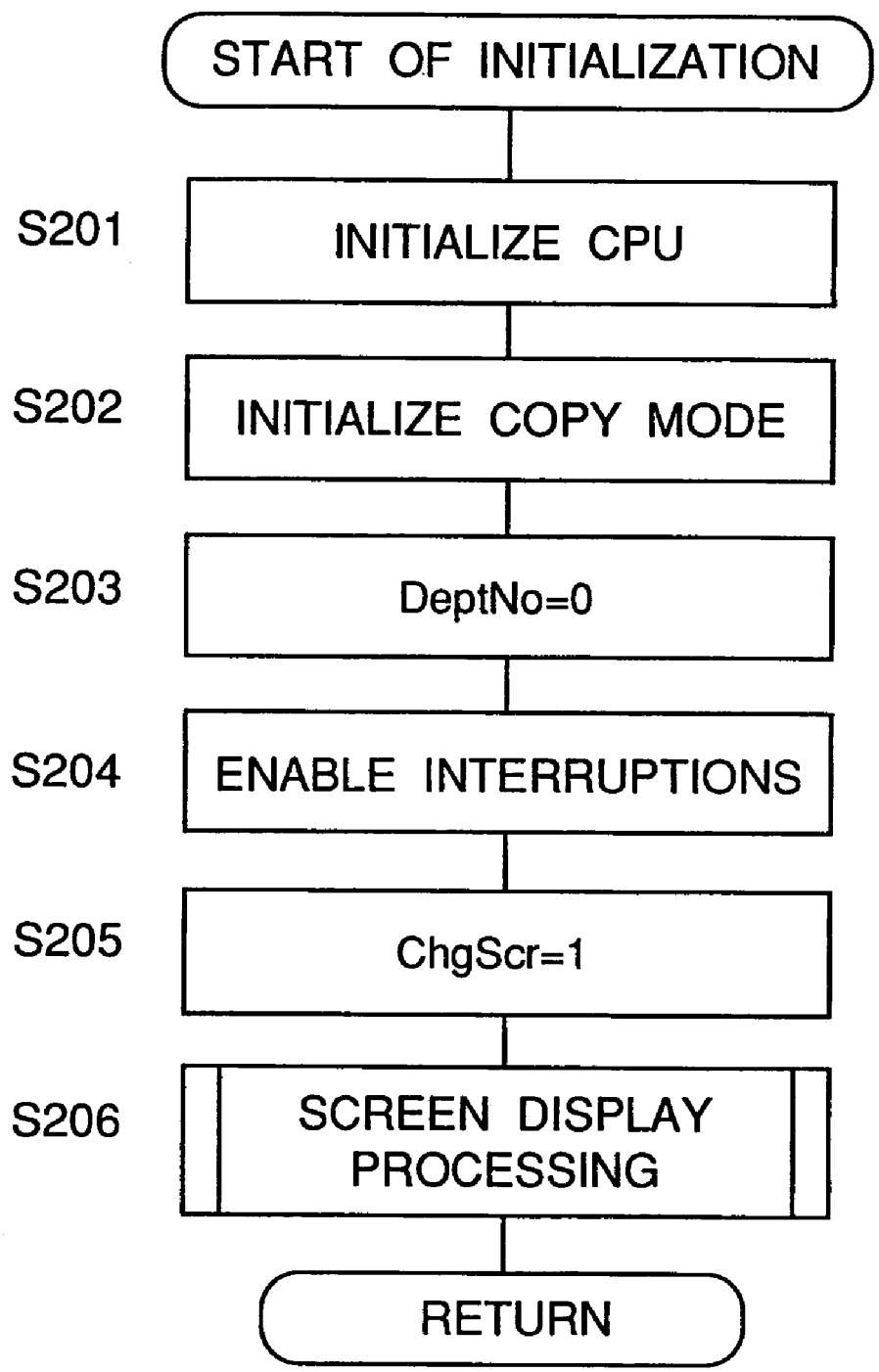
FIG. 7 is a chart showing a flow of initialization in the main flow of FIG. 6.
Figure 9:
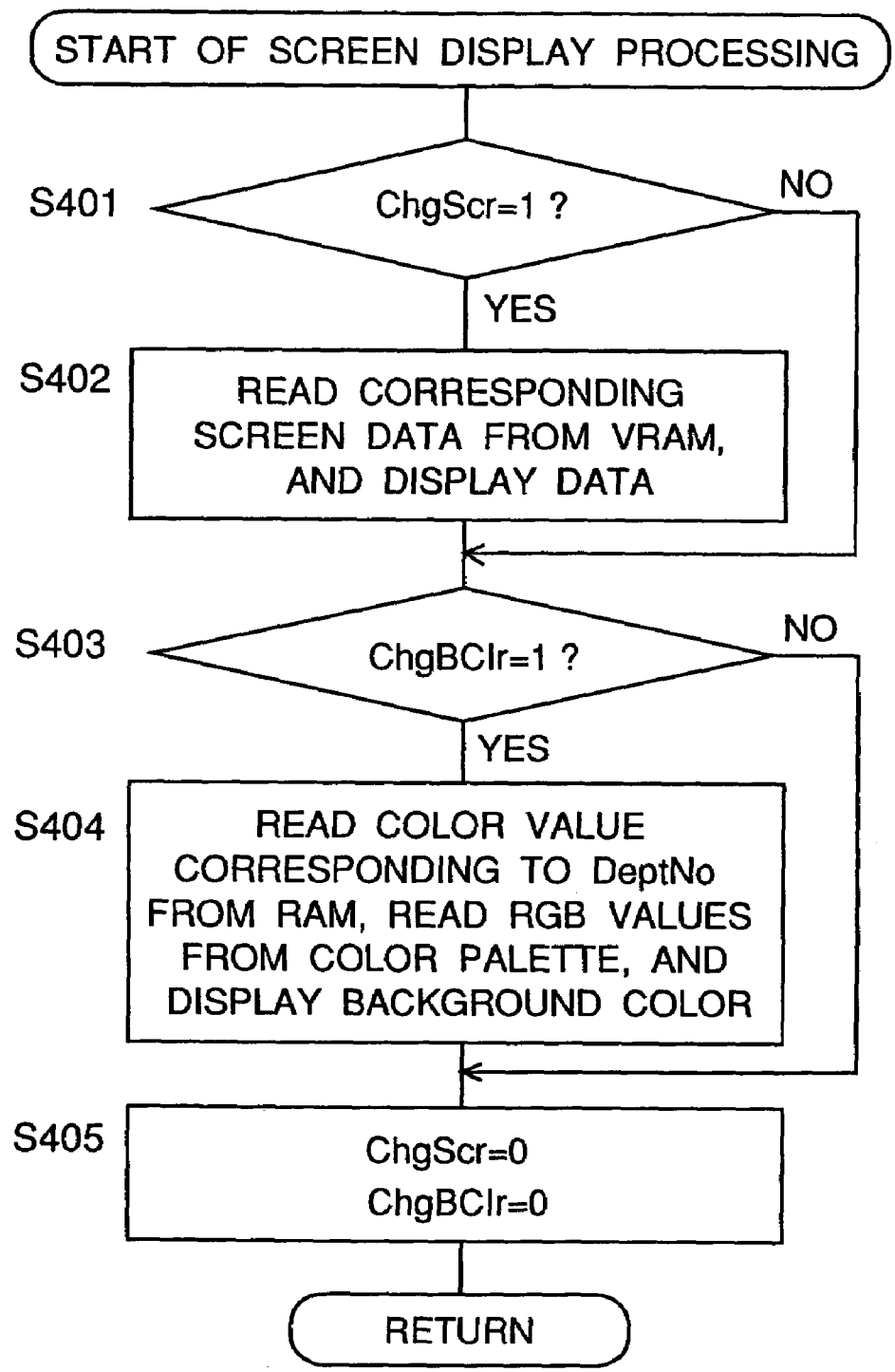
FIG. 9 is a chart showing a flow of screen display processing for rewriting data of a screen and a background color thereof.

More specifically, as shown in FIG. 7, first, the CPU 55 itself is initialized (S201). Then, the copy modes are initialized (S202). Then, the flag DeptNo is set to "0" so that a department and a job are not definite (S203). Then, interruptions from the print head portion 31, the touch switch 53, and a print key 61, etc. are enabled (S204). Then, to display an initial screen (FIG. 4), the flag ChgScr is set to a value "1" (S205), and screen display processing of rewriting the screen data and the background color is executed (S206). That is, as shown in FIG. 9, it is discriminated whether the flag ChgScr has been set to "1", namely, whether the screen data should be rewritten. In this case, because the flag ChgScr has been set to "1", the program goes to step S402 at which screen data corresponding to a new screen (which is in this case the initial screen.) to replace the preceding screen is read from the VRAM 57 and then, the screen data is supplied to the liquid crystal display device 52 (S402). Then, it is discriminated whether the flag ChgBClr (S403) has been set to "1". Because the flag ChgBClr is set to "0"in the initial state, the flag ChgScr and the flag ChgBClr are cleared to "0" (S405).

As a result of the initialization process, the initial screen (FIG. 4) is displayed, and each of the flags DeptNo, ChgScr, and ChgBClr is set to "0". The background color of the initial screen is white.

(2) Then, it is discriminated whether the user has carried out an input operation through the operation panel section 50 (which operation will be referred to as "panel input" hereinafter.) (S102). If the panel input has not been performed, the program goes to step S115 at which "other processing" is executed and the CPU 55 waits until the panel input is performed. If the panel input is carried out, input processing of determining the content of the panel input is executed (S103).

Figure 8:
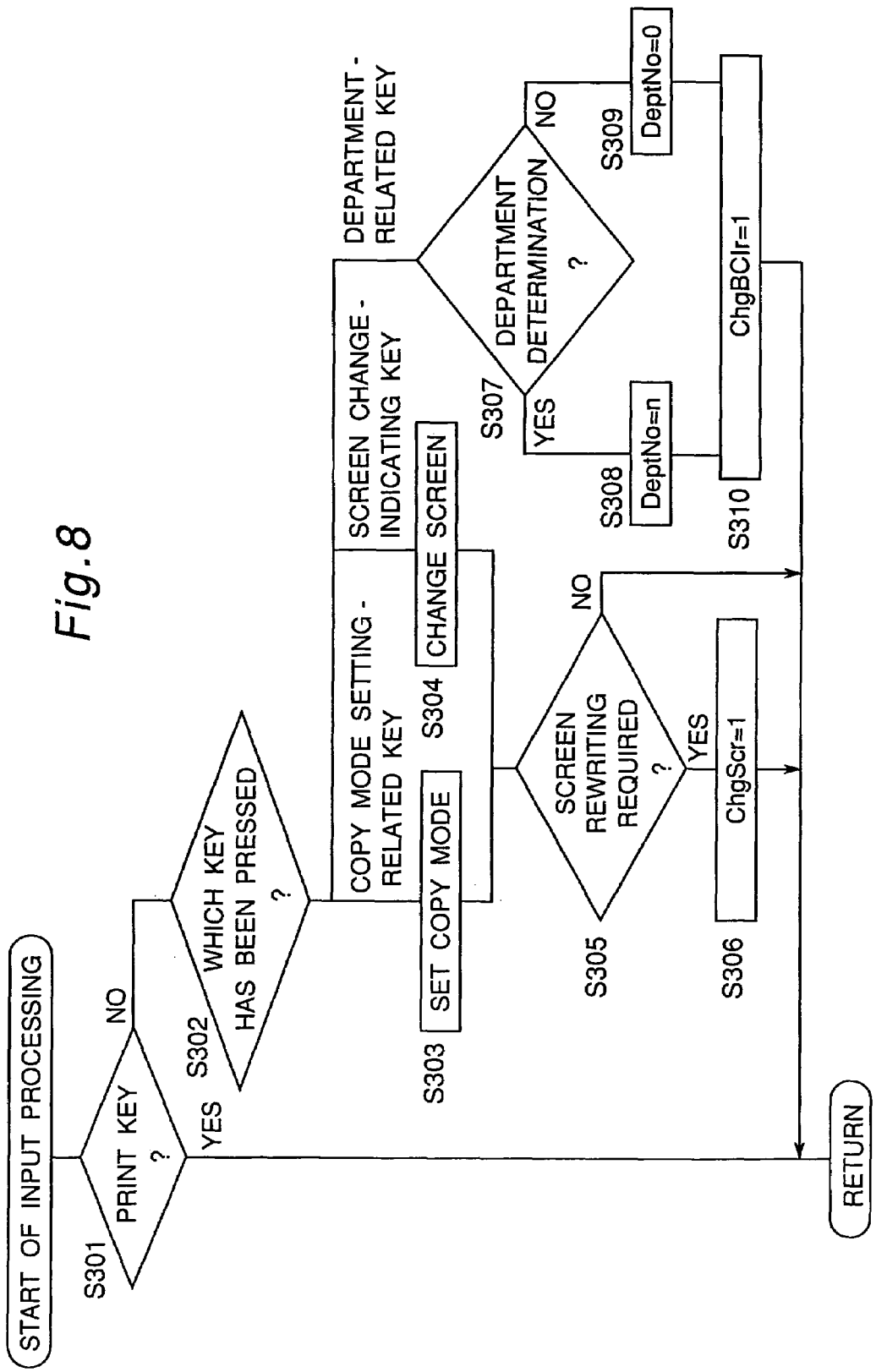
FIG. 8 is a chart showing a flow of input processing in the main flow of FIG. 6.

More specifically, as shown in FIG. 8, first, it is discriminated whether the panel input has been performed by depressing the print key 61 (S301). If the panel input has been performed by depressing the print key 61, the program immediately returns to the main routine because a demand for printing is processed at steps subsequent to the step shown in FIG. 6. If the panel input has been performed by pressing a key other than the print key 61, a key matrix corresponding to the screen presently displayed is read to determine the kind of the pressed key on the basis of the position at which the touch switch 53 has been depressed (S302). If the pressed key is a key for setting a copy mode (for example, selection of paper size), a copy mode setting processing corresponding to the key is executed (S303). If the pressed key is a key indicating the change of the screen, screen change processing corresponding to the key is executed (S304). In both cases, it is discriminated whether the setting of the copy mode or the change of the screen data requires the display screen to be rewritten (S305). If it is necessary to rewrite the display screen, the flag ChgScr is set to "1" to rewrite the display screen (S306). If it is determined at step S302 that the pressed key is a key for department determination or department cancellation, it is discriminated first whether the pressed key is a key for department determination, that is, for making definite a department to use the copying machine (S307) If the pressed key is the key for the department determination, it is assumed that a value (n) entered by the pressed key indicates a number proper to the department to use the copying machine. Thus, the flag DeptNo is set to the entered value (n) (S308). On the other hand, if the pressed key is the key indicating cancellation of a department, the flag DeptNo is set to a value "0" to indicate that nobody uses the copying machine (S309). In both cases of department determination and cancellation, the flag ChgBClr is set to "1" to rewrite the background color of the screen (S310) because the department to use the copying machine changes.

(3) Then, screen display processing to rewrite the screen data and/or the background color is executed in correspondence to the panel input (S104).

More specifically, as shown in FIG. 9, it is discriminated whether the flag ChgScr has a value "1", i.e., whether the screen data should be rewritten (S401). If the flag ChgScr has a value of "1", the program goes to step S402 at which screen data corresponding to a new screen to replace the current screen is read from the VRAM 57 and then, the screen data is supplied to the liquid crystal display device 52 (S402). As a result, in correspondence to the panel input, the screen data is rewritten. On the other hand, if the flag ChgScr has a value of "0", it is unnecessary to rewrite the screen data. Thus, the program goes to step S403. It is determined at step S403 whether or not the flag ChgBClr has a value of "1", namely, it is discriminated whether the background color of the screen should be changed. If the flag ChgBClr has a value "1", to rewrite the background color of the screen, a department number (a value set on flag DeptNo) is read from the RAM 58. Then, the component value of each of the components R, G, and B corresponding to the color value equal to the department number is read from the color palette 63, and the component values are supplied to the liquid crystal display device 52 (S404). As a result, the background color corresponding to the department currently using the copying machine is displayed on the screen. On the other hand, if the flag ChgBClr has a value "0", it is unnecessary to rewrite the background color data. Thus, the program goes to step S405. At step S405, the flags ChgScr and ChgBClr are cleared to "0", respectively.

(4) Thereafter, the program goes to step S105 of FIG. 6 at which information on the copy mode set by the user is transmitted to the print head portion 31.

(5) Then, it is discriminated whether the print key has been pressed by the user (S106). If the print key has not been pressed, the program goes to step S111 at which processing described later is performed. On the other hand, if the print key has been pressed, the program goes to step S107 at which it is discriminated whether a job to be started is a printing wait job in a multi-job time. If the job to be started is a printing wait job in the multi-job time, a value indicating the job to be started is inputted to the flag DeptNo, and the flag ChgBClr is set to a value "1" to change the background color of the screen (S108). Then, similarly to the processing of the above item (3), the screen display processing is executed (S109). In the screen display processing, because the flag ChgBClr is set to "1" in advance, the background color of the screen is changed without fail. If the job to be started is not the printing wait job in the multi-job time, the program goes to step S110.

(6) Then, at step S110, an instruction for starting printing is transmitted to the print head portion 31 (S110).

(7) Then, at step S111, the CPU 55 waits until it receives a printing termination signal from the print head portion 31. When the printing terminates and the CPU 55 receives the printing termination signal from the print head portion 31, it is discriminated whether the printing in the multi-job time terminates (S112). If the printing in the multi-job time terminates, the flag DeptNo is set to "0" and the flag ChgBClr is set to "1" to change the background color of the screen (S113). Then, similarly to the processing of the above item (3), screen display processing is executed (S114). As a result of the screen display processing, the initial screen (FIG. 4) is displayed, and the flags DeptNo, ChgScr, and ChgBClr are cleared to "0", respectively. Then, the program returns to step S102. On the other hand, if it is determined at step S112 that the printing in the multi-job time does not terminate, the program returns to step S102.

(8) If the panel input is executed again at step S102, the processing to be executed at steps S103–S114 are repeated.

As described above, according to the copying machine, a department and/or a user which uses it as well as a job being executed is represented by the corresponding background color of the screen. Thus, it is easy to secure the space, on the screen, for displaying or representing the department using the machine or the job being executed. Further, because the colors can be recognized visually, it is easy to recognize the department or the job. Consequently, it is possible to reduce mistakes such as forming an image by an erroneous input by the user.

Second Embodiment

Figure 10:
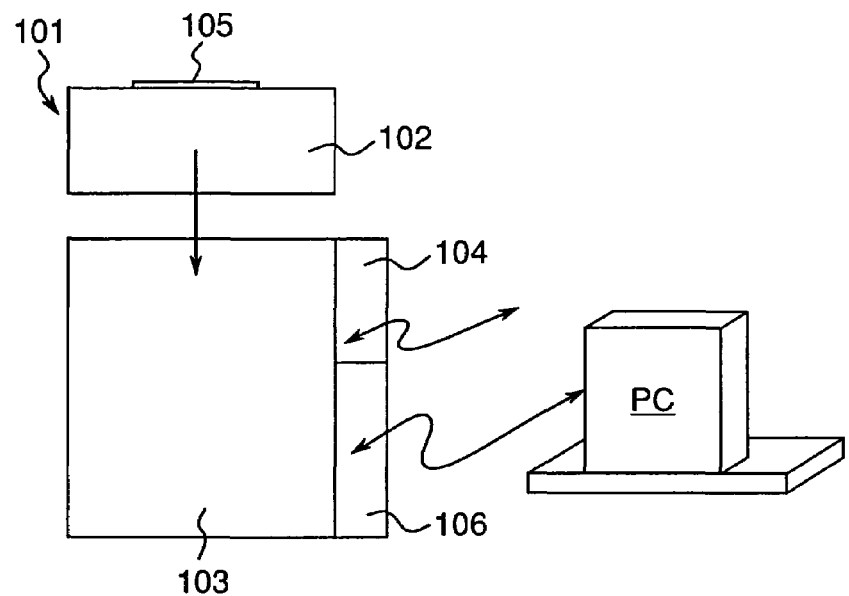
FIG. 10 schematically shows the construction of a composite apparatus having a copying function, a FAX function, and a printer function according a second embodiment of the present invention.

FIG. 10 schematically shows a construction of a digital copying machine 101 according to the second embodiment of the present invention. The digital copying machine 101 has a copying function, a FAX (facsimile) function, and a printing function, so that the machine 101 will be referred to as a composite apparatus below.

The composite apparatus 101 has an image reading section 102, a printing section 103 for printing image data, thus serving as an image forming section, a FAX modem 104 for sending image data to those located at remote places and receiving image data therefrom, an operation panel section 105 for allowing the user to enter various settings including setting of the copying function and the FAX function, and a controller 106 receiving data from a personal computer (hereinafter referred to as merely computer) PC.

Figure 11:
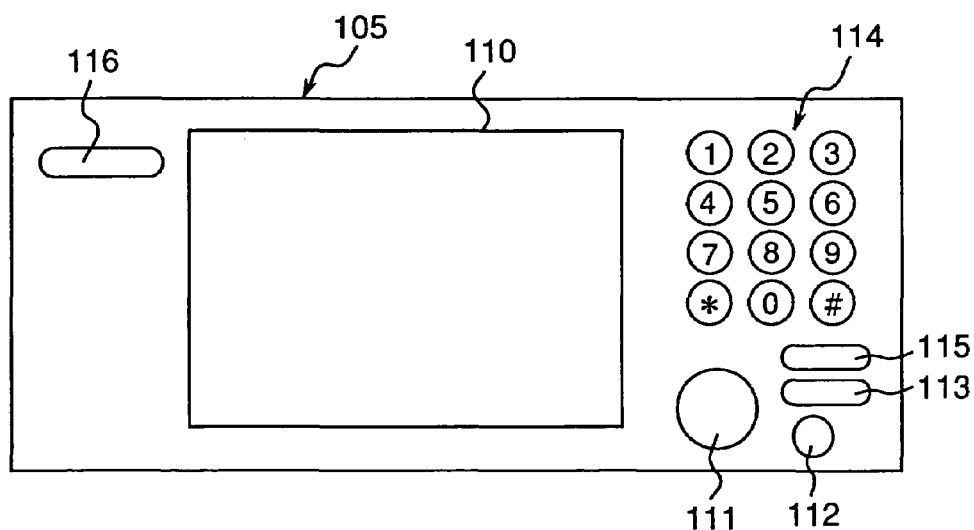
FIG. 11 is a front view showing a panel surface of an operation panel section of the composite apparatus shown in FIG. 10.

FIG. 11 is a view showing a surface of the operation panel section 105 seen from the front. On the surface of the panel section 105, there are provided a start key 111 for instructing start of the execution of the copying function, the FAX function, and the printer function, a stop key 112 for stopping the function being executed, a reset key 113 for initializing the screen and a set mode, a numeric keypad (i.e., ten key) 114 for entering numerals such as the number of copies and telephone numbers, a clear key 115 for clearing entered numerals, a copy/FAX function switching key 116 for switching the copying function to the FAX function or vice versa, and a color liquid crystal display portion 110. As will be described later, data such as number of sets, and a background color corresponding to a set function are displayed on the screen of the color liquid crystal display portion 110.

Figure 12:
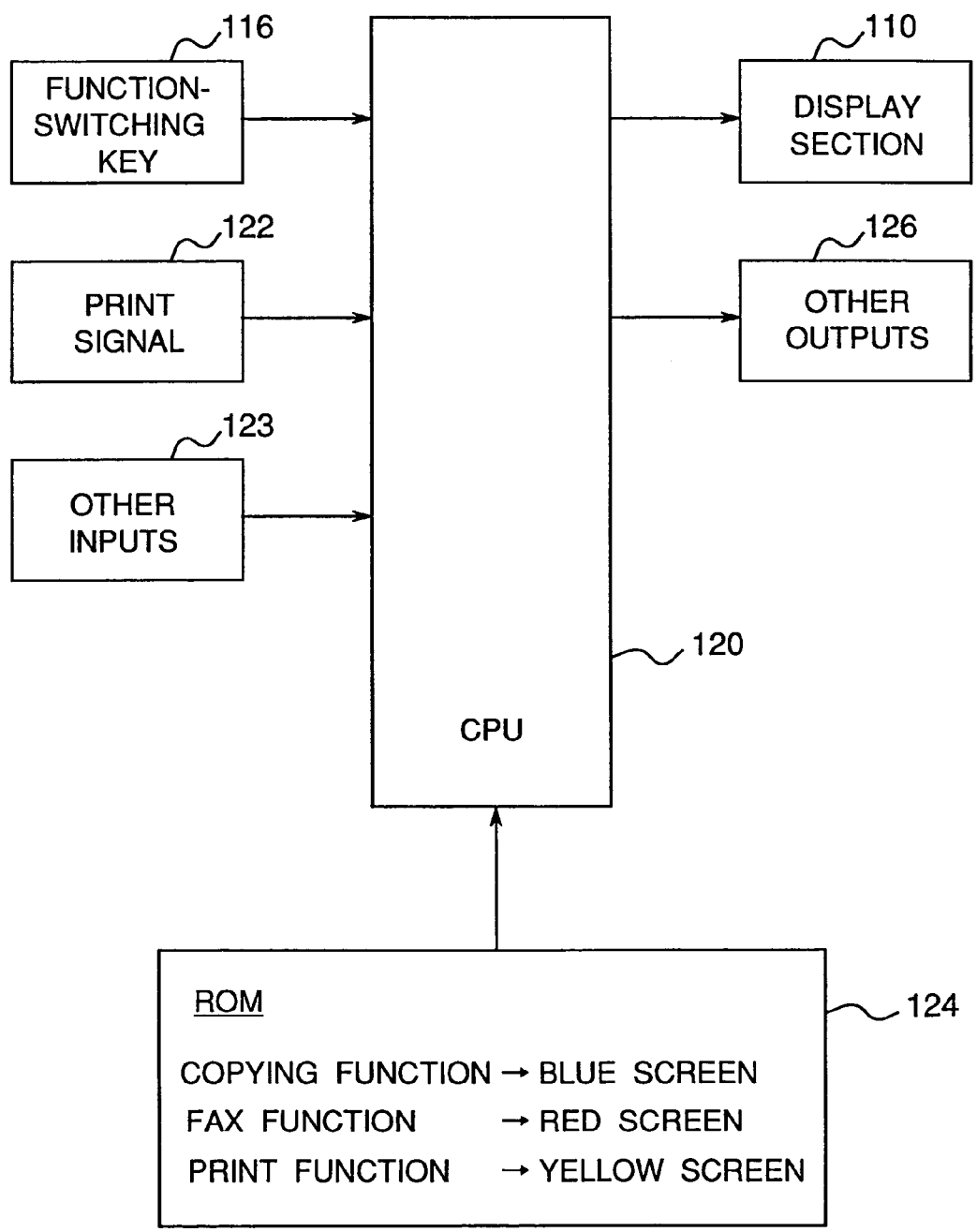
FIG. 12 is a block diagram showing a control system of the operation panel section of the composite apparatus.

FIG. 12 is a block diagram showing the control system of the operation panel section 105. The composite apparatus 101 comprises a CPU 120 controlling the entire operation panel section 105, and a ROM 124 storing background colors corresponding to each function of the composite apparatus 101. More specifically, the ROM 124 stores a blue color for the copying function, a red color for the FAX function, and a yellow color for the print function. When the copy/FAX function switching key 116 on the panel is turned on by a user or when a printing signal is transmitted to the CPU 120 from the computer PC through the controller 106, the CPU 120 reads the background color indicating the copying function, the FAX function or the print function from the ROM 124, thus making the color liquid crystal display portion 110 display the background color indicating the copying function, the FAX function or the printer function on the screen thereof. In addition, when the CPU 120 receives "other input" 123 entered by pressing of other keys, it transmits "other output" 126 to the main body (i.e., the image reading section 102 and the printing section 103) of the composite apparatus 101.

Figure 13:
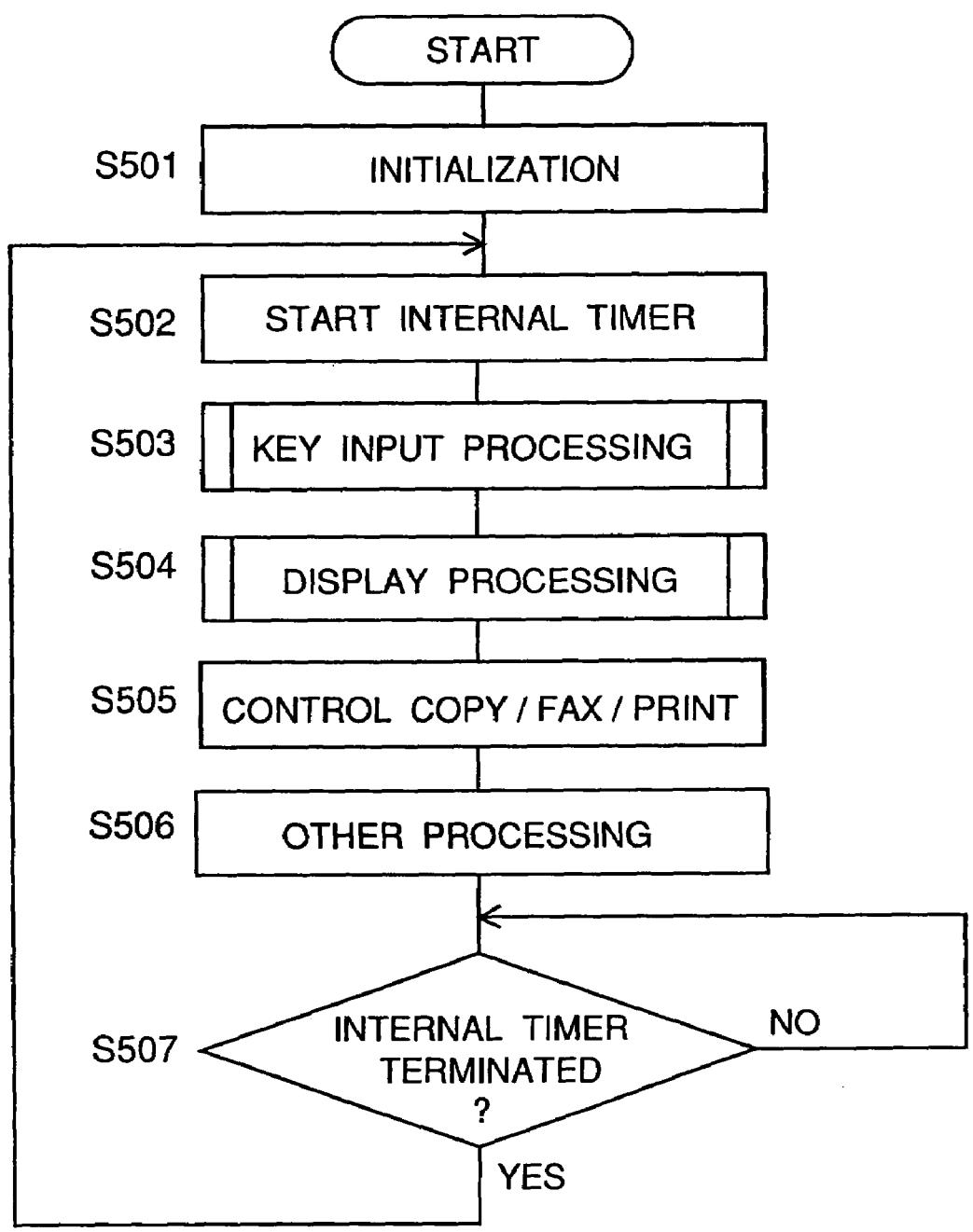
FIG. 13 is a chart showing a main flow of a processing which is executed by the composite apparatus.

FIG. 13 shows the main routine of the operation of the composite apparatus 101.

(1) When reset occurs on the CPU 120 and the program starts, initialization is executed (S501). That is, a RAM (not shown) is cleared, various registers are set, the counting value of an internal timer is set. Thus, the CPU 120 itself is initialized, and the composite apparatus 101 is set to an initial mode.

(2) Then, the internal timer of the CPU 120 is started (S502).

(3) Then, key input processing is executed by the CPU 120 (S503).

Figure 14:
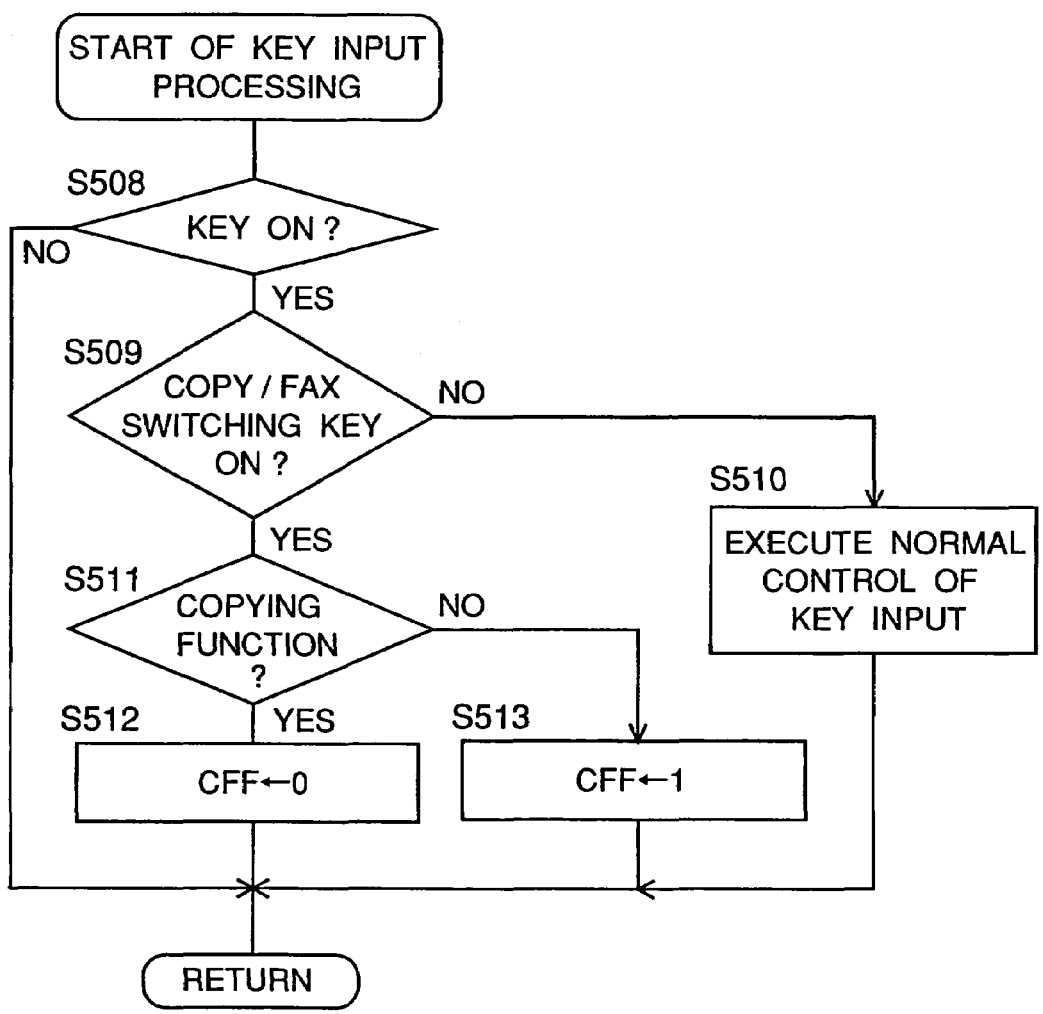
FIG. 14 is a chart showing a flow of key input processing in the main flow shown in FIG. 13.

That is, as shown in FIG. 14, first, it is discriminated whether the user has turned on a key of the panel section 105 (hereinafter referred to as "key input") (S508). If key input has not been executed, the program goes to step S504 of the main routine which will be described later. On the other hand, if key input has been executed, it is discriminated whether the key is the copy/FAX function switching key 116 (S509). If the key is not the copy/FAX function switching key 116, normal control is executed (S510) for the turned-on key. On the other hand, if the copy/FAX function switching key 116 is turned on, it is discriminated whether the screen currently displayed on the liquid crystal display portion 110 is the screen of the copying function (S511). If the screen currently displayed is the screen of the copying function, a copying function flag CFF is set to off-edge (CFF=0) (S512). If the screen currently displayed is not the screen of the copying function, the copying function flag CFF is set to on-edge (CFF=1) (S513).

(4) Then, at step S504, the CPU 120 executes display processing.

Figure 15:
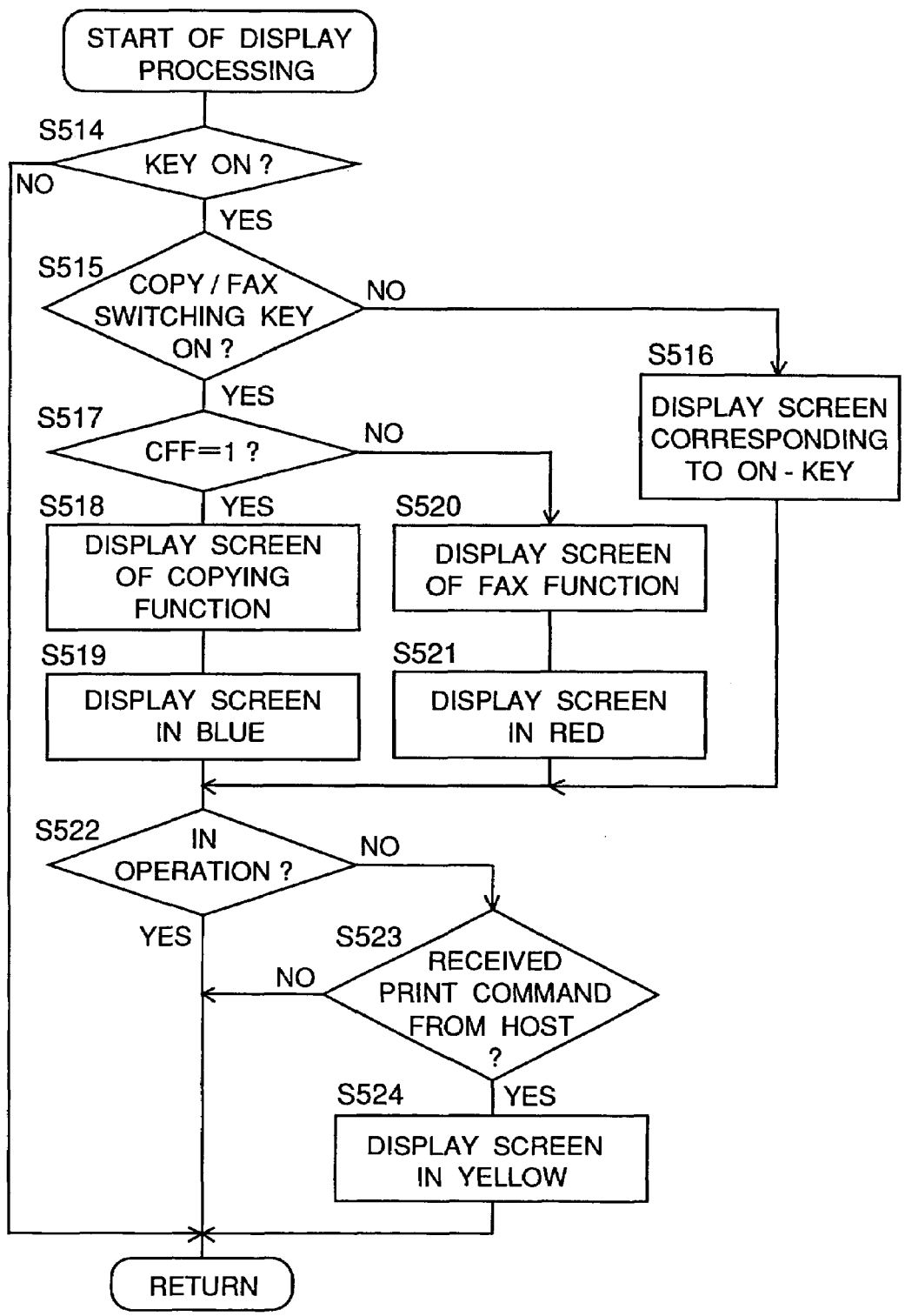
FIG. 15 is a chart showing a flow of display processing in the main flow shown in FIG. 13.

That is, as shown in FIG. 15, similarly to input processing, it is discriminated whether or not key input has been carried out (S514). If key input has not been executed, the program goes to step S505 of the main routine which will be described later. On the other hand, if key input has been carried out, it is discriminated whether the pressed key is the copy/FAX function switching key 116 (S515). If the pressed key is not the copy/FAX function switching key 116, a screen display corresponding to the pressed key is executed (S516). On the other hand, if the copy/FAX function switching key 116 has been turned on, it is discriminated whether the copying function flag CFF is on edge (CFF=1) (S517). If the copying function flag CFF is on edge (CFF=1), the CPU 120 switches the screen of the liquid crystal display portion 110 to the screen of the copying function (S518), reads data of the blue color indicating the copying function from the ROM 124, and sets the background color of the screen to blue (S519). On the other hand, if the copying function flag CFF is off edge (CFF=0), the CPU 120 switches the screen of the liquid crystal display portion 110 to the screen of the FAX function (S520), reads data of the red color indicating the FAX function from the ROM 124, and sets the background color of the screen to red (S521). Then, regarding the display of the printer function, it is judged whether the printing section 103 is operating (S522). If the printing section 103 is operating, the program goes to step S505 of the main routine which will be described later. If the printing section 103 is not operating but a printing command has not been received from the computer PC (S522), the program also goes to step S505 of the main routine. If the printing command is received from the computer PC (S523) while the printing section 103 is not operating (S522), the CPU 120 reads the yellow color data indicating the FAX function from the ROM 124, thus setting the background color of the screen to yellow (S524).

(5) Then, control processing of copy/FAX/printer is executed (S505).

That is, the printing section 103 is controlled to execute the copying function, the FAX function or the printing function when any one of the three functions is designated.

(6) Then, other necessary processing is executed (S506).

(7) Then, when the internal timer finishes counting of the initially set value, one routine terminates. Then, the program returns to step S502.

Using the length of the time that one routine takes, counting of various timers which are used at steps S503, S504, S505, and S506 is executed. The termination of each timer is determined according to the number of repetition of the one routine.

As described above, because according to the composite apparatus, a selected function is displayed on the screen as a background color corresponding thereto, the space for displaying the selected function can be securely obtained on the screen. Further, because the colors can be visually recognized, the user can distinguish the selected function from other functions easily. Consequently, it is possible for even a beginner to reduce the mistakes such as forming an image because of selection of an erroneous function. Furthermore, when the user transmits image data to the composite apparatus of the present invention from an external apparatus, the user can easily see whether the transmitted data has appropriately been processed. Moreover, when a plurality of users transmit image data to the composite apparatus from external devices simultaneously or at approximately the same time and a trouble occurs on a job during execution thereof, the user who has instructed the execution of the job can be identified easily. Thus, processing for troubles can be smoothly accomplished.

In the second embodiment, the screen is displayed in blue when the copy function operates, in red when the FAX function operates, and in yellow when the printer function operates. But the screen may be displayed in other colors. What is important is that the color of the screen can allow the user to distinguish a set function from the other functions.

The composite apparatus 101 has the copying function, the FAX function, and the printer function. But the composite apparatus 101 may include other composite functions.

In the second embodiment, the composite apparatus has three functions. But the composite apparatus may have only two functions or more than three functions.

Further, in addition to displaying a department using the composite apparatus, and a job or a function (destination to which job is transmitted) as the corresponding background color of the screen, they may be displayed on the screen by using pictorial symbols or the like corresponding thereto.

Third Embodiment

A digital color copying machine of a third embodiment of the present invention will be described below with reference to FIGS. 16–27. A schematic sectional view of the digital color copying machine of the third embodiment of the present invention, a front view of the surface of an operation panel section, and a block diagram of a control system in the operation panel section are similar to those of the digital color copying machine of the first embodiment of the present invention shown in FIGS. 1, 2 and 3, respectively. Accordingly, description of the same parts of the third embodiment as those of the first embodiment is omitted and parts of the third embodiment different from those of the first embodiment are described mainly, using the reference numerals and symbols which are used in the first embodiment.

As described below, the RAM 58 of the third embodiment stores various data of: (i) copy modes to be set by a user and copy modes to be automatically set based thereon, (ii) copy modes to be set and code values indicating causes of the setting of the copy modes, and (iii) various data such as color values corresponding to the respective causes of the setting of the copy modes.

(i) As shown in FIG. 17, the RAM 58 has a table associating a copy mode set by the user with a copy mode automatically set based thereon. For example, when the user sets the number of copies (or sets) to two or more, the RAM 58 automatically sets a sorting mode in which copying paper is automatically delivered to a sorter such that copying paper sheets of each copy or set are placed one on another in the order of page number (automatic setting 1). The reason the sorting mode is automatically set is that if the copying paper sheets are delivered to the sorter without being sorted, it is necessary for the user himself or herself to sort the copying paper sheets. That is, in order to allow the user to reduce his task, the sorting mode is automatically set if the copying machine has a sorter. When the user sets a book mode in which a bound two-page spread of a book or a magazine is copied on one side of a sheet of copying paper or on both sides thereof, a center erase mode is automatically set in which the image of the document is copied with a central portion thereof erased so that the shade of the seam of the book or the magazine is not copied in black (automatic setting 1). Further, when the user sets a "2 in 1" copy mode in which two pages are copied in a compressed manner on a single side of a copying paper sheet, a magnification "×0.707" is automatically set (automatic setting 1), lengthwise A4 is automatically selected as the size and orientation of the copying paper (automatic setting 2), and an upper binding margin is secured (automatic setting 3). As described above, the RAM 58 stores the correspondence between the copy modes set by the user and the copy modes automatically set based on the copy mode set by the user, for users' convenience.

(ii) The RAM 58 has a table for associating a copy mode set by the user with a code value indicating the cause for the setting of the copy mode. Specifically, the RAM 58 stores every copy mode of the copying machine, values currently set for the respective copy modes (the values indicate the setting contents of the copy modes, including ON/OFF and so forth), and code values indicating the causes for the setting of the copy modes. For a copy mode which has not yet been set (including the case where an initial value remains), the RAM 58 stores a code value "0" as a cause of setting. Also, the RAM 58 stores a code value "1" for a copy mode set by the user, and a code value "2" for a copy mode set automatically by the copying machine.

(iii) Further, as shown in FIG. 18, the RAM 58 has a table for associating the causes for the setting of copy modes with color values indicating colors which each are to be displayed on the screen of the liquid crystal display device 52. Color values 3, 16, and 64 correspond to a copy mode-unset state (code value: 0), a copy mode the user sets by key input, and a copy mode set automatically by the copying machine, respectively. As will be described later, a color indicated by each of the color values is displayed on a display region for the copy mode (copy mode display region) of the screen.

Figure 16:
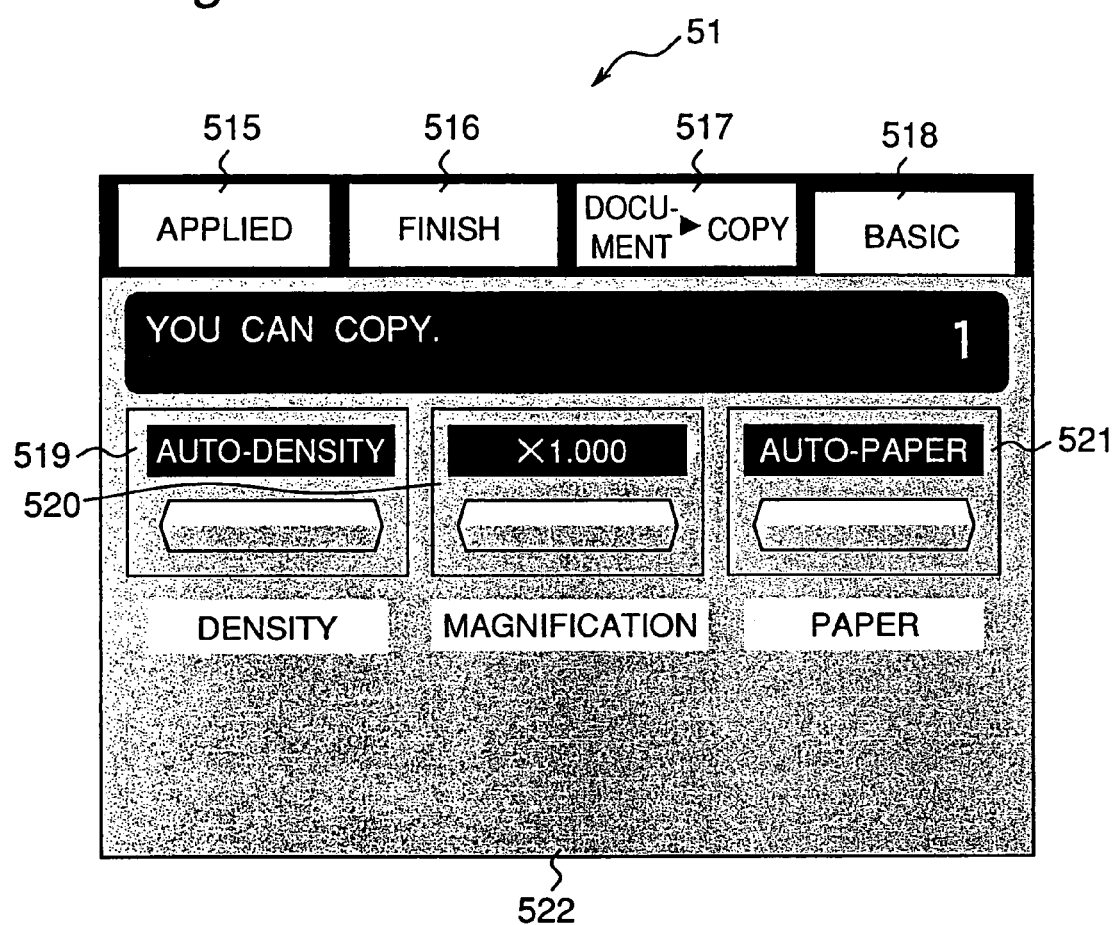
FIG. 16 is a view showing an example of an initial screen which is displayed by a liquid crystal display device of an operation panel section of a third embodiment.

FIG. 16 shows a key input screen (initial screen) displayed by the liquid crystal display device 52.

The user touches the region of keys 515–521 displayed on the key input screen through the touch switch 53, thus operating the touch switch 53.

The user can change the screen, set a copy mode, and set a department or division which uses the copying machine, by depressing the keys 515–521. Further, when a copy mode of the copying machine becomes definite through input of the touch switch 53, the CPU 55 creates a display screen displaying a copy mode display region corresponding to the copy mode in a color indicated by the corresponding color value stored in the RAM 55. Then, the CPU 55 transmits control signals to the color palette 63 and the LCD controller 56 to switch the display screen of the liquid color display device 52.

Figure 20:
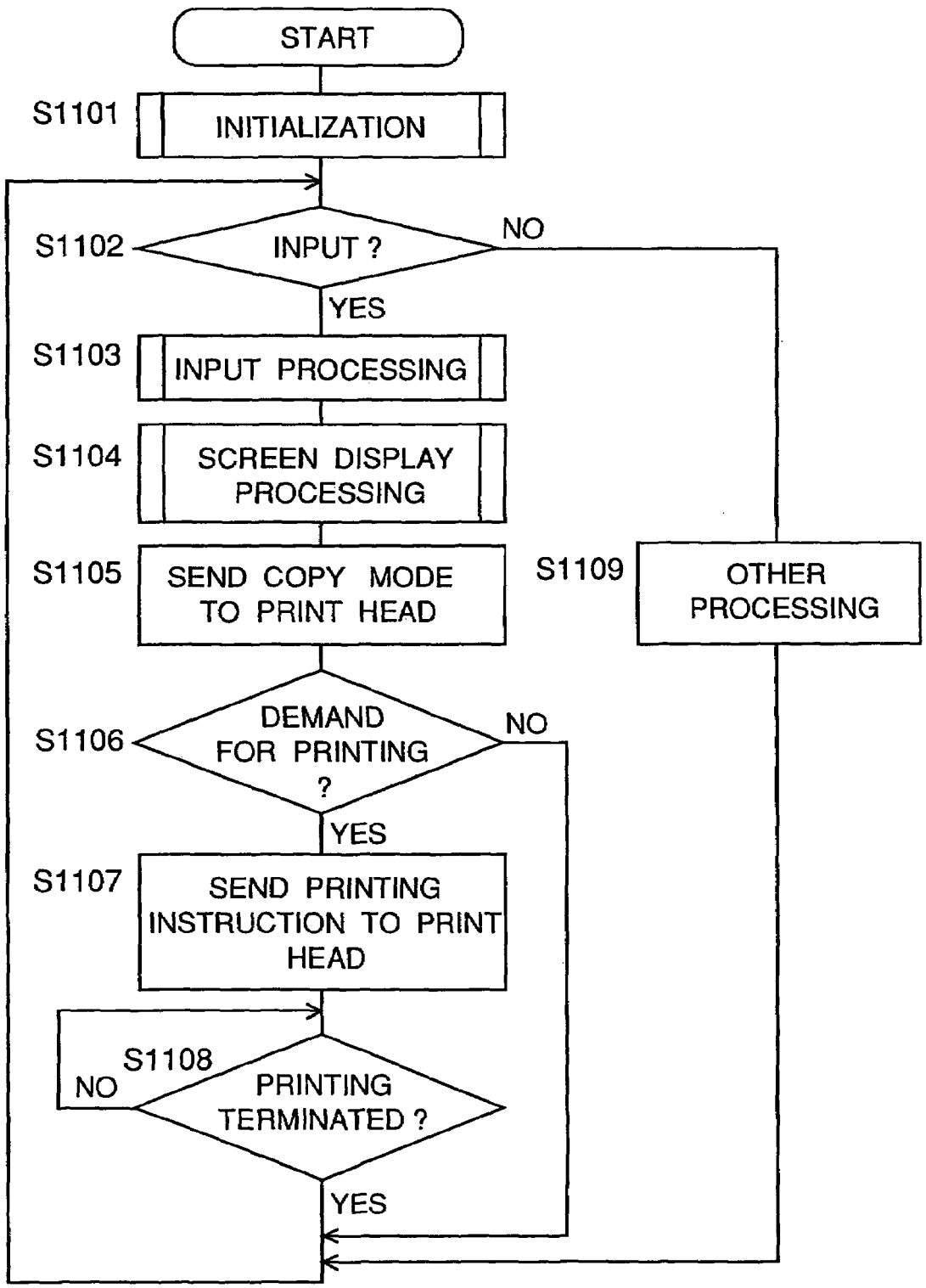
FIG. 20 is a chart showing a main flow of a processing which is executed by a CPU in the operation panel section of the third embodiment.

FIG. 20 shows a main routine of display control processing which is executed by the CPU 55 in the third embodiment.

In display control processing, two kinds of flags ChgScr and ChgClr are used.

The flag ChgScr indicates whether a display screen should be rewritten (changed) or not. More specifically, a value "0" of the flag ChgScr indicates that the display screen should not be rewritten, whereas a value "1" of the flag ChgScr indicates that the display screen should be rewritten.

The flag ChgClr indicates whether or not the color of the copy mode display region on the screen should be changed. More specifically, a value "0" of the flag ChgClr indicates that the color of the copy mode display region should not be changed, whereas a value "1" of the flag ChgClr indicates that the color of the copy mode display region should be changed.

Now, the main routine is described.

(1) When the copying machine is powered on, the CPU 55 executes processing of initializing the copy mode and the flags (S1101).

Figure 21:
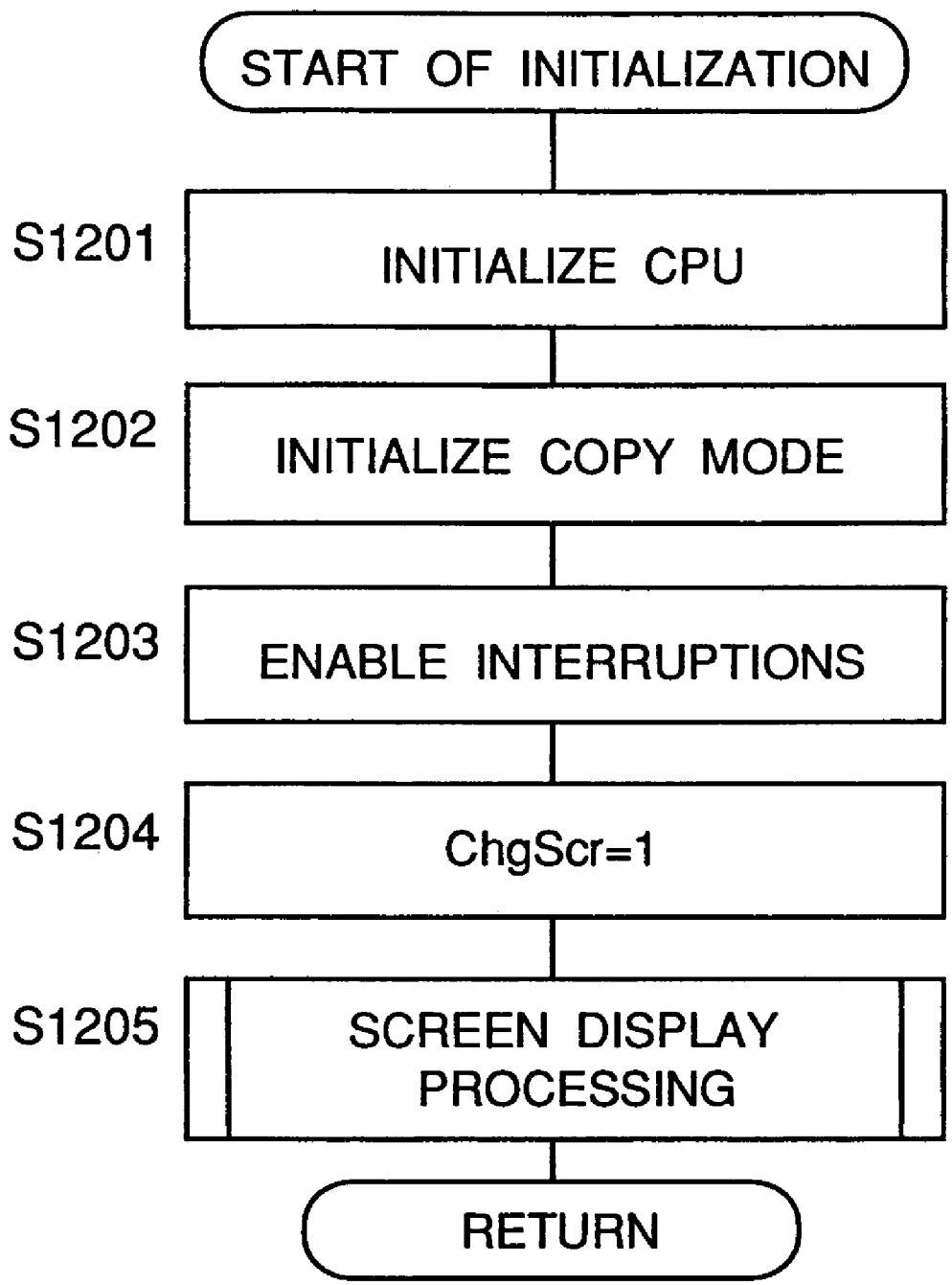
FIG. 21 is a chart showing a flow of initialization in the main flow of FIG. 20.
Figure 23:
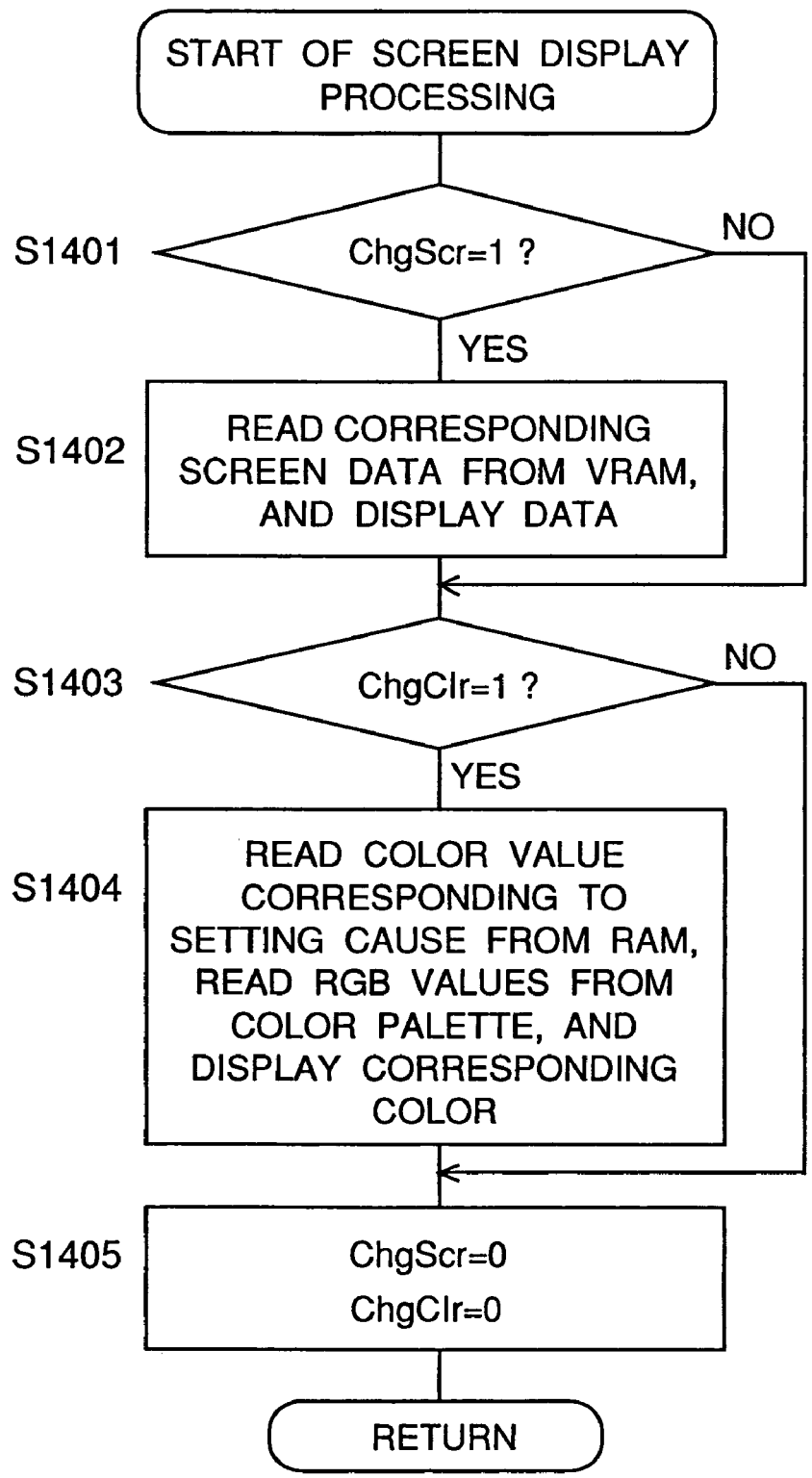
FIG. 23 is a chart showing a flow of screen display processing for rewriting a display screen and a copy mode display region.

More specifically, as shown in FIG. 21, first, the CPU 55 itself is initialized (S1201), and then, the copy modes are initialized (S1201). Then, interruptions from the print head portion 31, the touch switch 53, the print key 61, and other parts are enabled (S1203). Then, to display the initial screen, the flag ChgScr is set to "1" (S1204) to execute screen display processing for changing the display screen and/or the color of the copy mode display region (S1205). That is, as shown in FIG. 23, it is discriminated whether the flag ChgScr has been set to "1", namely, whether the data of the display screen should been rewritten (S1401). In this case, because the flag ChgScr has been set to "1", the program goes to step S1402 at which screen data corresponding to a replacement screen (initial screen) is read from the VRAM 57 and then, the screen data is sent to the liquid crystal display device 52 (S1402). Then, it is discriminated whether or not the flag ChgClr has been set to "1" (S1403). Because the flag ChgClr has a value "0" in the initial state, the flags ChgScr and ChgClr are cleared to "0" (S1405).

As a result of the initializing processing, the initial screen (FIG. 16) is displayed, and each of the flags ChgScr and ChgClr has a value "0".

(2) Then, it is discriminated whether the user has performed an input operation through the operation panel section 50 (hereinafter referred to as "the panel input") (S1102). If no panel input is executed, the program goes to step S1109 at which "other processing" is executed and the CPU 55 waits until the panel input is executed. If the panel input is performed, input processing to determine the content of the panel input is executed (S1103)

Figure 22:
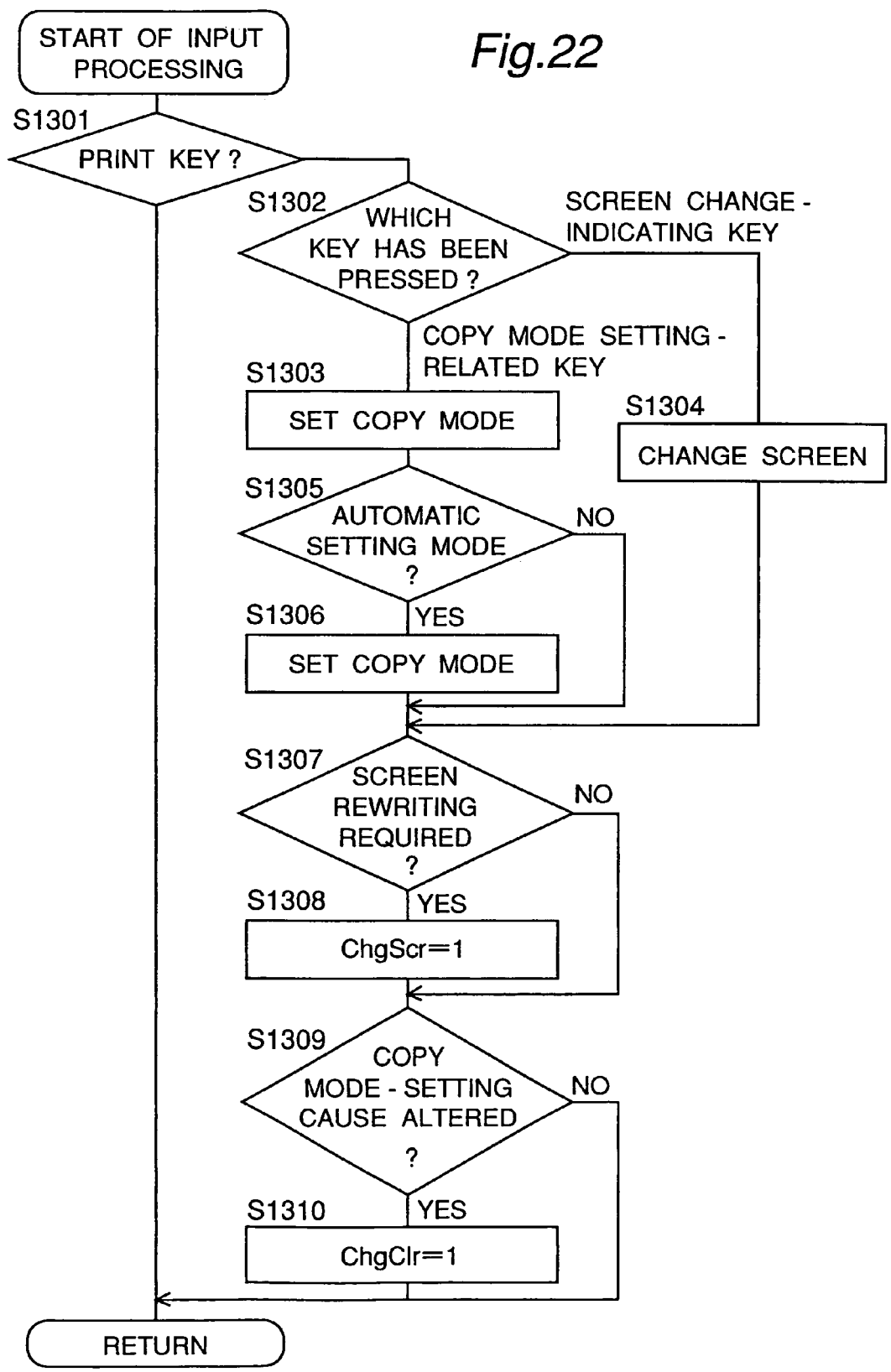
FIG. 22 is a chart showing a flow of input processing in the main flow of FIG. 20.

More specifically, as shown in FIG. 22, first, it is discriminated whether the panel input has been executed by pressing the print key 61 (S1301). If the panel input has been executed by pressing the print key 61, the program returns to the main routine immediately because data of a demand for printing is processed at subsequent steps shown in FIG. 20. If the panel input has been executed by depressing a key other than the print key 61, a key matrix corresponding to the screen presently displayed is read to identify the kind of the pressed key on the basis of a position in which the touch switch 53 has been depressed (S1302).

If the pressed key is a key for setting a copy mode (e.g., selection of paper size), copy mode setting processing corresponding to the key is executed (S1303) That is, a value entered through the key input is written to the table of the RAM 58 shown in FIG. 19 for the subject copy mode, and the code value "1" is also written thereto as the cause for the setting of the copy mode to indicate that the copy mode has been set by the user. Then, with reference to the table of the RAM 58 shown in FIG. 17, it is discriminated whether there is a copy mode which is to be set automatically in association with the setting of the copy mode (S1305). If there is a copy mode to be set automatically, a predetermined value for the copy mode is written to the table of the RAM 58 shown in FIG. 19, and the code value "2" indicating that the copy mode has been set automatically is written thereto as the cause for the setting of the copy mode. On the other hand, if the pressed key is a key for instructing a screen change, screen change processing corresponding to the key is executed (S1304). That is, screen data corresponding to the replacement screen is stored by the VRAM 57.

Then, it is discriminated whether the display screen should be rewritten as a result of the setting of the copy mode and change of the screen, namely whether the setting of the copy mode and change of the screen require the screen rewriting (S1307). If it is necessary to rewrite the display screen, the flag ChgScr is set to "1" to rewrite the display screen (S1308). On the other hand, if it is unnecessary to rewrite the display screen, the program goes to step S1309.

It is determined at step S1309 whether or not the cause for the setting of the copy mode has been changed. If the cause for the setting of the copy mode has been changed, the flag ChgClr is set to "1" to change the color of the copy mode display region regardless of whether the display screen is rewritten or not (S1309). If the cause for the setting of the copy mode has not been changed, the program returns to the main routine of FIG. 20.

(3) Then, screen display processing of rewriting the color of the display screen and the copy mode display region is executed in correspondence to the panel input (S2104).

More specifically, as shown in FIG. 23, it is discriminated whether the flag ChgScr has been set to "1", namely, whether the display screen should be rewritten. If the flag ChgScr has been set to "1", the program goes to step S1402 at which the screen data corresponding to the replacement screen, i.e., a screen to be newly displayed, is read from the VRAM 57 and then, the screen data is output to the liquid crystal display device 52 (S1402). As a result, in correspondence to the panel input, the display screen is rewritten. On the other hand, if the flag ChgScr has been set to "0", it is necessary to rewrite the display screen. Thus, the program goes to step S1403. It is determined at step S1403 whether or not the flag ChgClr has been set to "1", namely, it is discriminated whether the color of the copy mode display region on the screen should be changed. If the flag ChgClr has been set to "1", the cause (code value) for the setting of the copy mode is read from the table of the RAM 58 shown in FIG. 19, and a color value corresponding to the cause (code value) is read from the table shown in FIG. 18. Then, the component value (see FIG. 5) of each of the components R, G, and B corresponding to the color value is read from the color palette 63, and the component values are supplied to the liquid crystal display device 52 (S1404). As a result, the color corresponding to the cause for the setting of the copy mode is displayed on the copy mode display region on the screen. On the other hand, if the flag ChgClr has a value "0", it is unnecessary to change the color of the copy mode display region. Thus, the program goes to step S1405. At step S1405, the flags ChgScr and ChgClr are cleared to "0", respectively.

(4) Thereafter, the program goes to step S1105 of FIG. 20 at which information on the copy mode set by the user is transmitted to the print head portion 31.

(5) Then, it is discriminated whether the print key 61 has been pressed by the user (S1106). If the print key has not been pressed, the program returns to step S1102 at which the CPU 55 waits for the panel input. On the other hand, if the print key is pressed, the program goes to step S1107 at which the CPU 55 gives a command to the print head portion 31 to start printing.

(6) Then, at step S1108, the CPU 55 waits until it receives a printing termination signal from the print head portion 31. When the printing terminates and the CPU 55 receives the printing termination signal from the print head portion 31, the program returns to step S1102.

(7) If the panel input is executed again at step S1102, the CPU 55 repeats the processing executed at steps S1103–S1108.

Figure 24:
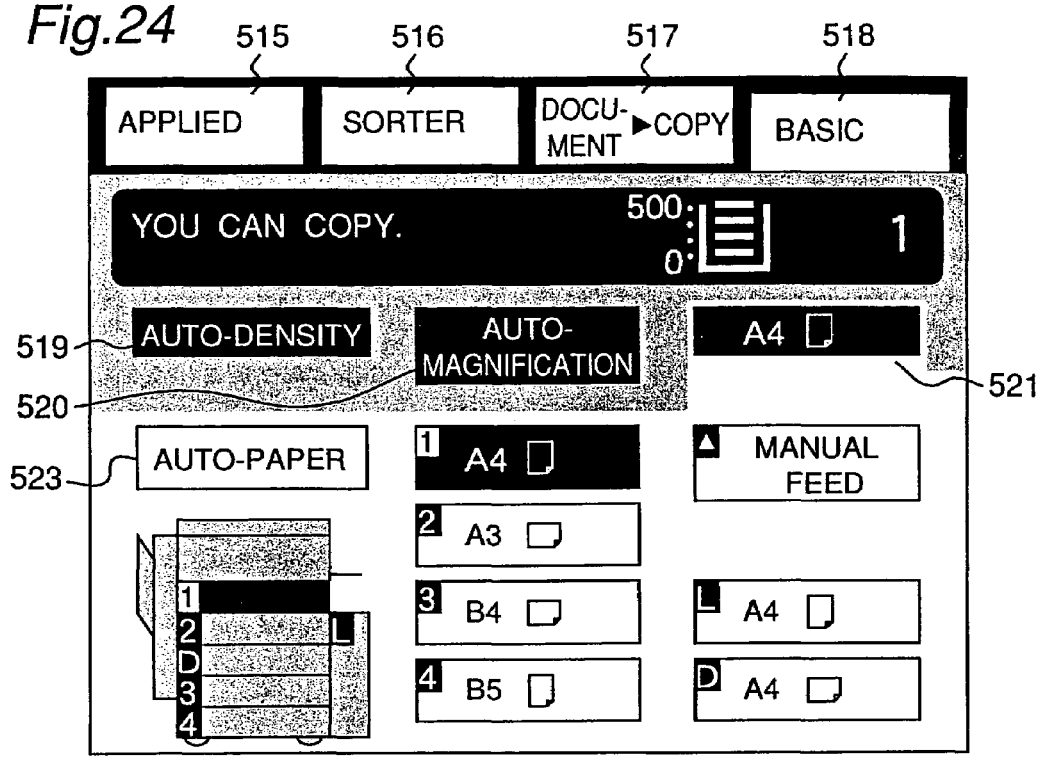
FIGS. 24, 25, 26 and 27 each shows an example of a screen which is displayed by the liquid crystal display device as a result of the processing executed by the CPU in the operation panel section.
Figure 25:
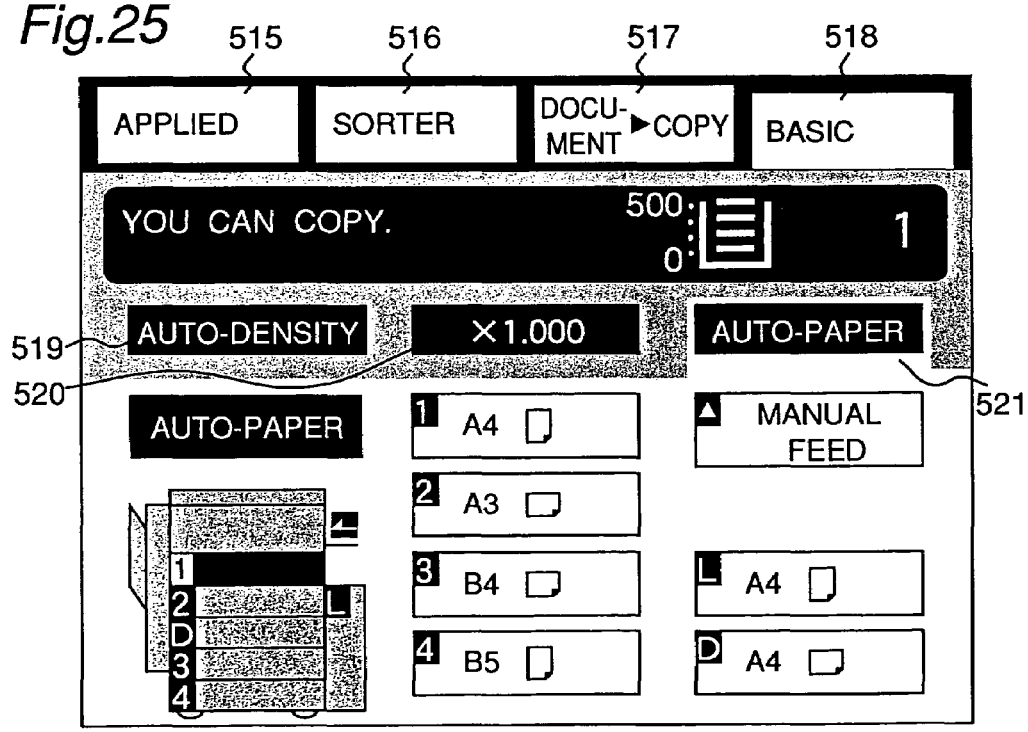
Figure 26:
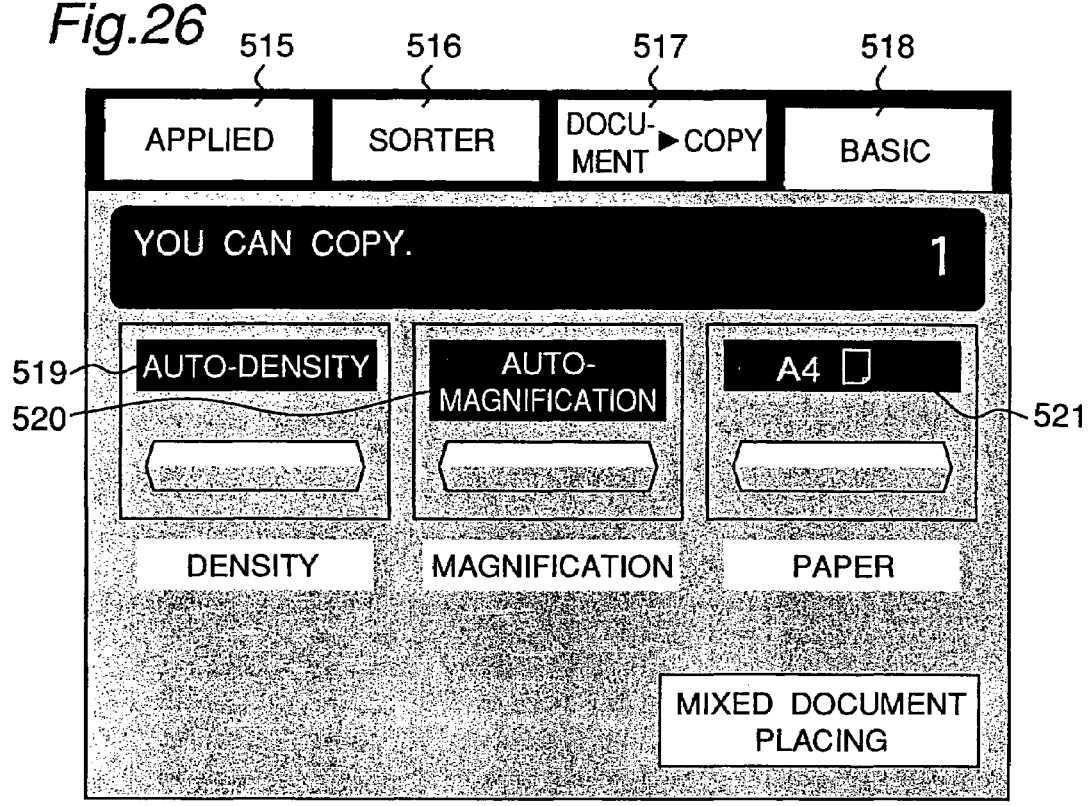
Figure 27:
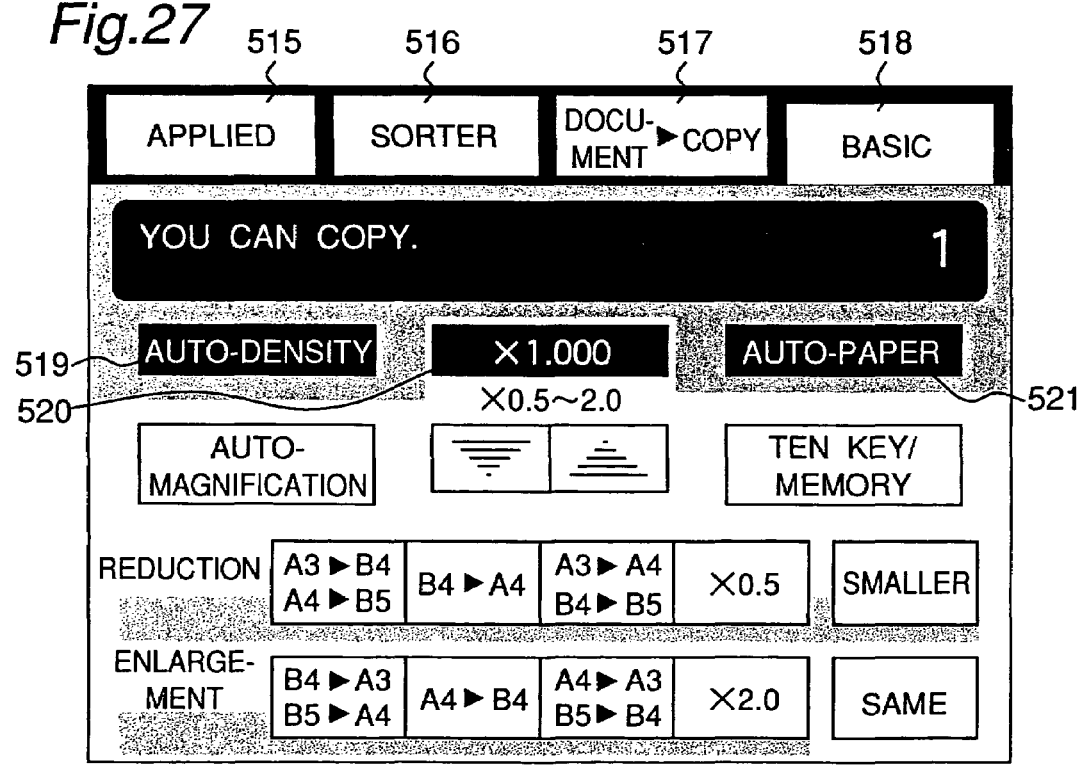

Giving an example, suppose that a key input screen shown in FIG. 24 is being displayed on the liquid crystal display device 52. In this case, for a copy mode, a paper size of "lateral A4" has been selected. In this state, if the user presses a basic key 518, the screen of the liquid crystal display device 52 changes to a basic screen as shown in FIG. 26. On the other hand, if the user presses an "automatic paper" key 523 on the key input screen shown in FIG. 24, an automatic paper mode (mode in which the size of copying paper is automatically switched in accordance with the size of document) is set as the copy mode, as shown in FIG. 25. At this time, for the convenience of the user, a same size mode (indicated as "×1.000") is automatically set by the copying machine. Because the cause for the setting of the same size mode is classified into the category of "automatic setting", the color of the copy mode display region 540 indicating the magnification "×1.000" is switched, as shown in FIG. 27, from an original color of light blue, for example, to blue (for convenience, the color is shown in black in FIG. 27).

As described above, according to the copying machine, when a copy mode is automatically set, the copy mode display region for the copy mode is displayed in a color different from a color in which the display region is displayed when the same copy mode is manually set by the user. Thus, based on the color of the copy mode display region, the user can visually and easily recognize the presence and contents of copy modes automatically set, if any. Consequently, the user can be allowed to reduce the operation mistakes such as pushing a start button while the machine is placed in an unintended copy mode, thus having convenience.

Instead of changing the color of the copy mode display region to indicate the automatically set copy mode, marks (for example, pictorial symbols such as characters, figures, symbols, combinations thereof, and combinations of the characters, figures, symbols, and colors) for discriminating the automatically set copy mode from other copy modes may be displayed on the screen. In this case, values for specifying the kinds of marks (mark-specifying values) are stored in the table of the RAM 58 shown in FIG. 18 instead of the color values, and actual display data corresponding to the mark-specifying values are stored in the VRAM 57. Then, if it is determined at step S1403 of the screen display processing shown in FIG. 23 that the flag ChgClr has been set to "1", the program goes to step S1404 at which the mark-specifying value corresponding to the cause for the setting of the copy mode (i.e., the code value) is read from the table of the RAM 58 shown in FIG. 18, and the display data of the mark is read from the VRAM 57. Thus, the mark is displayed on the screen.

Fourth Embodiment

A digital color copying machine of a fourth embodiment of the present invention will be described below with reference to FIGS. 28–34. FIGS. 29, 31, 32, and 34 are common to this fourth embodiment and the following two embodiments. Also, a schematic sectional view of the digital color copying machine of the third embodiment of the present invention, a front view of the surface of an operation panel section, and a block diagram of a control system in the operation panel section are similar to those of the digital color copying machine of the first embodiment of the present invention shown in FIGS. 1, 2 and 3, respectively. Accordingly, description of the same parts of the third embodiment as those of the first embodiment is omitted here and parts of the third embodiment different from those of the first embodiment are described mainly, using the reference numerals and symbols which are used in the first embodiment.

The RAM 58 has a backup battery and stores data such as (i) various copy mode-set states and (ii) color values corresponding to the respective set copy mode states.

The RAM 58 has a table indicating the various copy mode-set states, as shown in FIG. 29. The table contains classification data indicating whether each copy mode of the copying machine belongs to a basic function (represented as "basic") or an applied function (represented as "applied"); copy modes (e.g., number of copies, paper size, copying magnification, and the like) thus classified; values currently set for the copy modes (the values indicate currently set contents of the copy modes including ON/OFF, and so forth); values of a flag Set indicating whether a copy mode has been set or not. For a copy mode set by the user, a value "0" is set on the flag Set. For a copy mode not set by the user, a value "1" is set on the flag Set. The value "1" is also an initial value of this flag.

(ii) The RAM 58 also has a table for associating various copy mode-set states (indicated by a value of variable "Model") with color values indicating background colors of the screen of the liquid crystal display device 52. The copy mode-set states include an initial state, a basic function-set state and an applied function-set state. The "initial state" (Mode=0) refers to a state in which none of the copy modes is set and thus the value of the flag Set of each copy mode is "0". The "basic function-set state" (Mode=1) refers to a state in which one or more copy modes are set and the set copy mode or modes are classified into the "basic" function in the table of FIG. 29. The "applied function-set state" (Mode=2) refers to a state in which one or more copy modes are set and the one copy mode or one or more of the copy modes are classified into the "applied" function in the table of FIG. 29. Color values 3, 16, and 64 correspond to the "initial state" (Mode=0), the "basic function-set state" (Mode=1), and the "applied function-set state" (Mode=2), respectively. In executing display control processing which will be described later, the variable "Mode" is switched from one value to another according to the relevant copy mode-set state, and a color represented by a color value corresponding to the value of the variable "Mode" is adopted as the background color of the screen.

Figure 28:
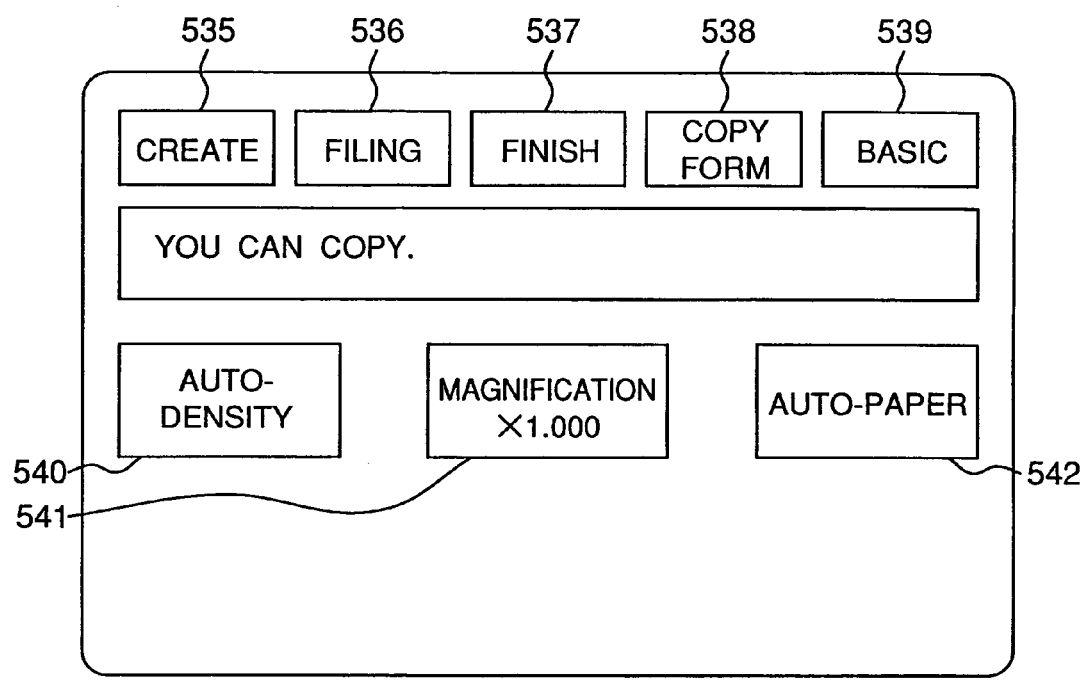
FIG. 28 shows an example of a screen of a liquid crystal display device of an operation panel section of a fourth embodiment of the present invention.

FIG. 28 shows a key input screen (initial screen) displayed by the liquid crystal display device 52. Similarly to the embodiments described above, when the user depresses any one of keys 535–542 displayed on the key input screen, the screen change or a copy mode setting is performed by the operation of the touch switch 53, the CPU 55, the RAM 58, and the VRAM 57, and the LCD controller 56.

Figure 31:
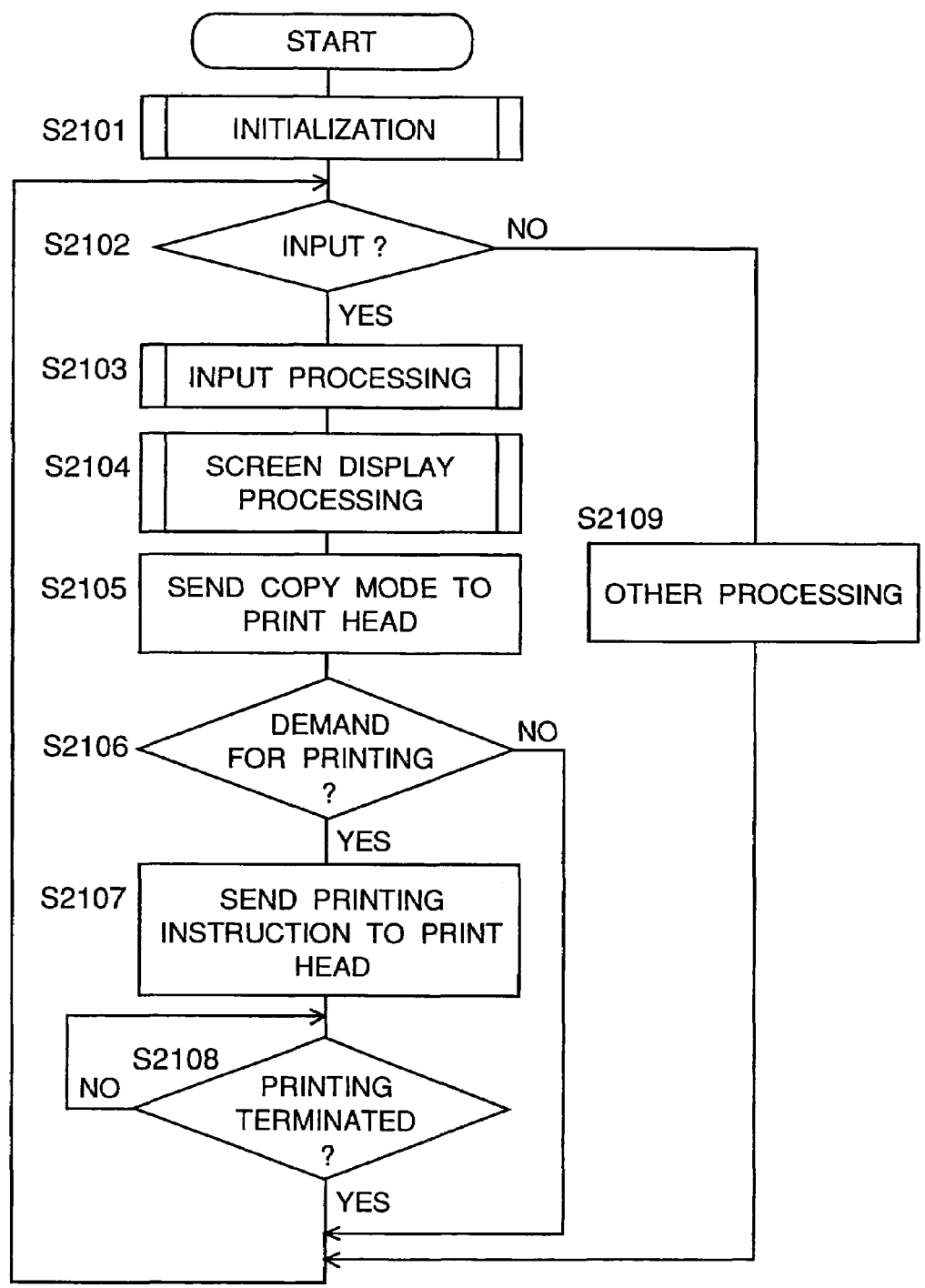
FIG. 31 is a chart showing a main flow of display control processing in the fourth embodiment.

FIG. 31 shows a main routine of a display control processing which is executed by the CPU 55.

In the display control processing, in addition to the flag Set indicating setting/non-setting of each of the copy modes and the variable "Mode" indicating the copy mode-set state, two kinds of flags ChgScr and ChgBClr are used.

The flag ChgScr indicates whether screen data should be rewritten or not. More specifically, the flag ChgScr set to a value "0" indicates that the screen data should not be rewritten, and the flag ChgScr set to a value "1" indicates that the screen data should be rewritten.

The flag ChgBClr indicates whether the background color of the screen should be changed or not. More specifically, the flag ChgBClr set to a value "0" indicates that the background color of the screen should not be changed, whereas the flag ChgBClr set to "1" indicates that the background color of the screen should be changed.

Now, the display control processing routine is described.

(1) When the power source of the main body of the copying machine is turned on, the CPU 55 executes processing of initializing the copy modes and the flags (S2101).

Figure 32:
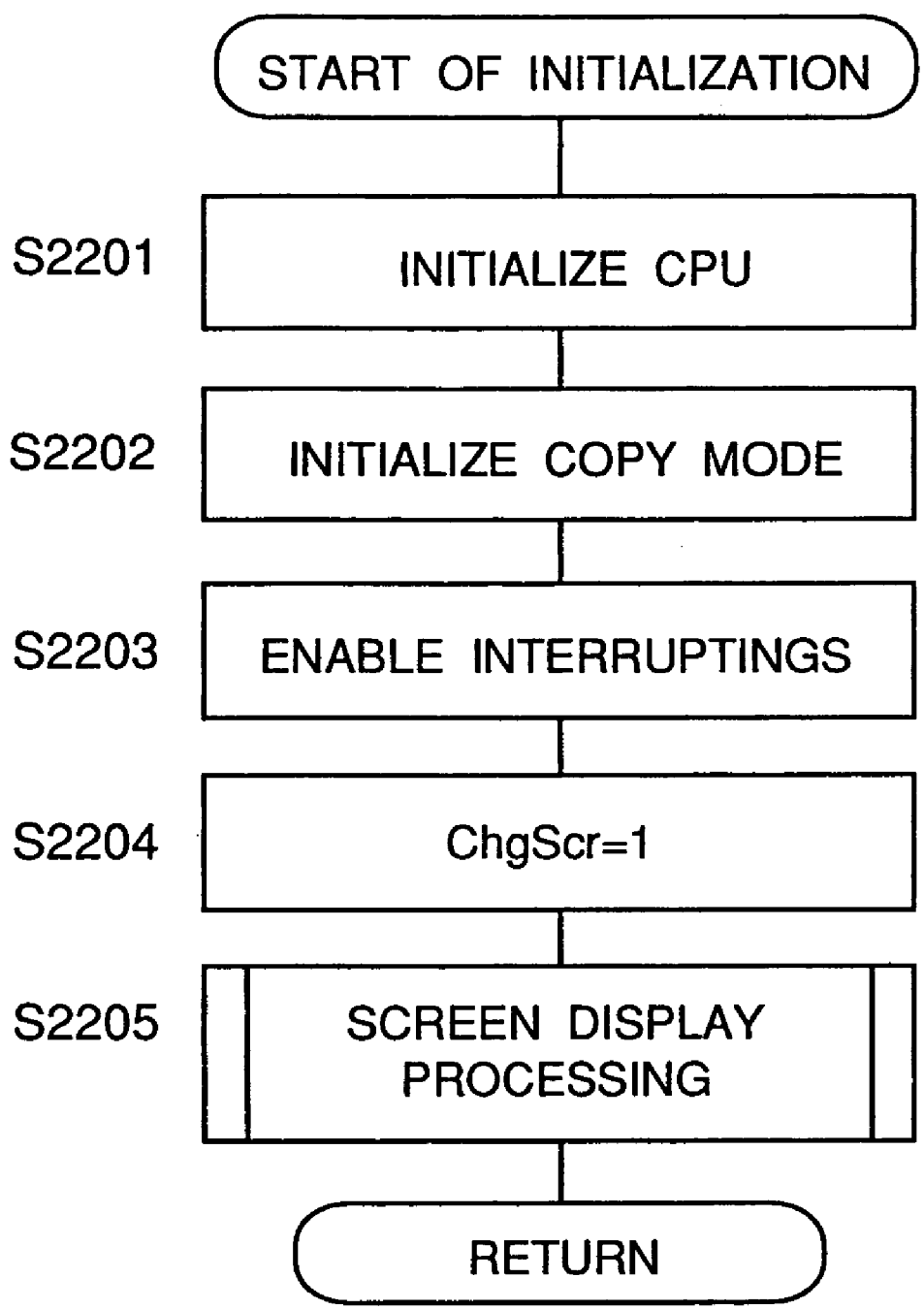
FIG. 32 is a chart showing a flow of initialization in the main flow of FIG. 30.
Figure 34:
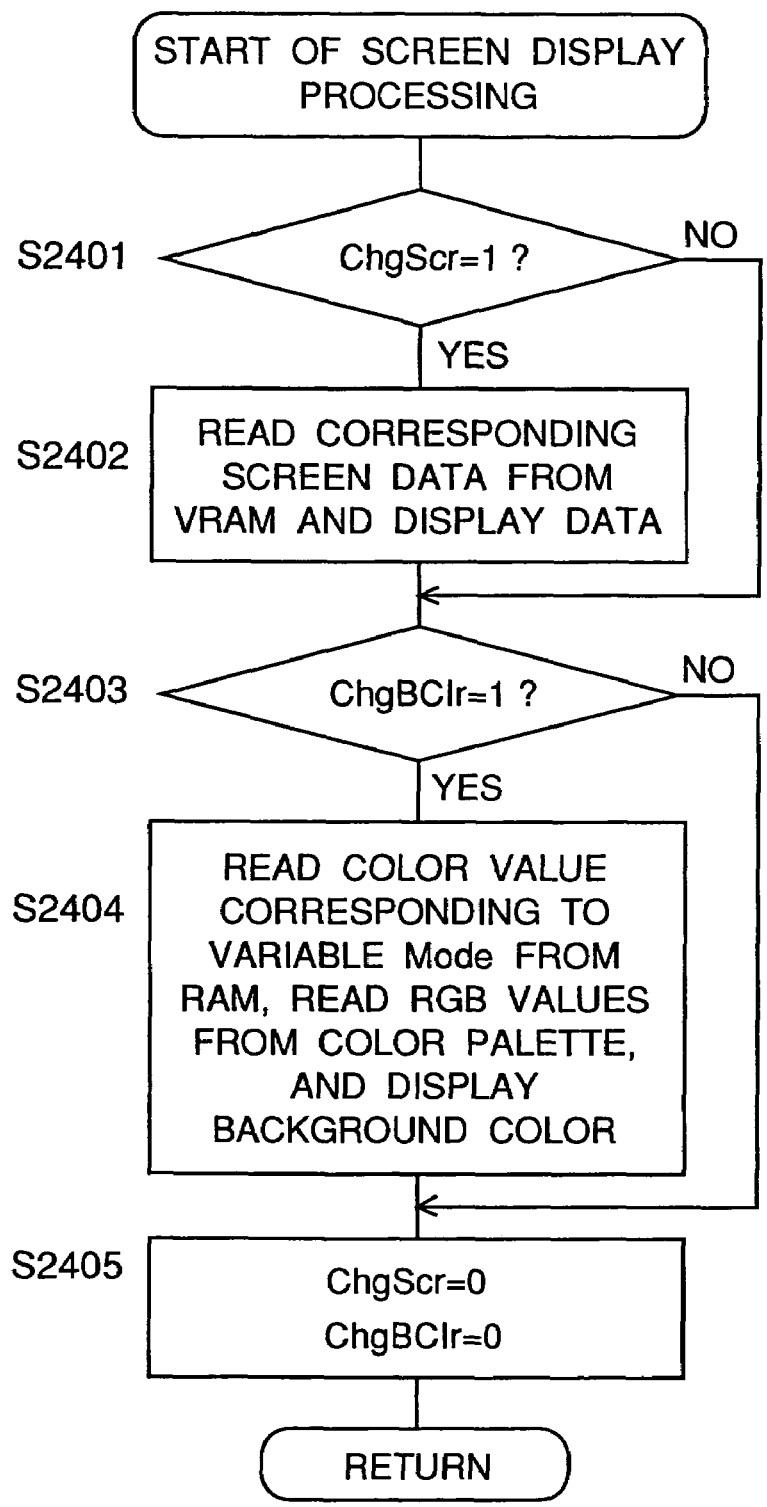
FIG. 34 is a chart showing a flow of screen display processing for rewriting data of a screen and a background color thereof.

More specifically, as shown in FIG. 32, first, the CPU 55 itself is initialized (S2201). Then, the copy modes are initialized (S2202). At this time, in the table of the RAM 58 shown in FIG. 29, the value of each copy mode is set to an initial value and the flag Set is cleared to "0" for each copy mode. Then, interruptions from the print head portion 31, the touch switch 53, the print key 61 and other parts are enabled (S2203). Then, to display an initial screen (FIG. 28), the variable "Mode" is set to "0" and the flag ChgScr is set to "1" (S2204) to execute a screen display processing including rewriting the screen data and changing the background color (S2205). That is, as shown in FIG. 34, it is first discriminated whether the flag ChgScr has been set to "1", namely, whether the screen data should be rewritten. In this case, because the flag ChgScr has been set to "1" in advance, the program goes to step S2402 at which screen data corresponding to a replacement screen (which is a screen to be newly displayed, and is the initial screen at this time.) is read from the VRAM 57 and then, the screen data is outputted to the liquid crystal display device 52 (S2402). Then, it is judged whether the flag ChgBClr has been set to "1" (S2403). The flag ChgBClr is set to "1" in the initial state. Thus, a color value ("3") corresponding to the value of the variable "Mode" ("0" in the initial state) is read from the RAM 58, and the component values of each of the components R, G, and B corresponding to the color value are read from the color palette 63 and supplied to the liquid crystal display device 52 (S2404). As a result, the background color (pale blue now) corresponding to the initial state is displayed on the screen. Then, the flags ChgScr and ChgBClr are cleared to "0" (S2405).

(2) Then, it is judged whether the user has performed an input operation through the operation panel section 50 (hereinafter referred to as "the panel input") (S2102). If the panel input has not been performed, the program goes to step S2109 at which "other processing" is executed, and the CPU 55 waits for the panel input. If the panel input is performed, input processing for determining the contents of the panel input is executed (S2103).

Figure 33:
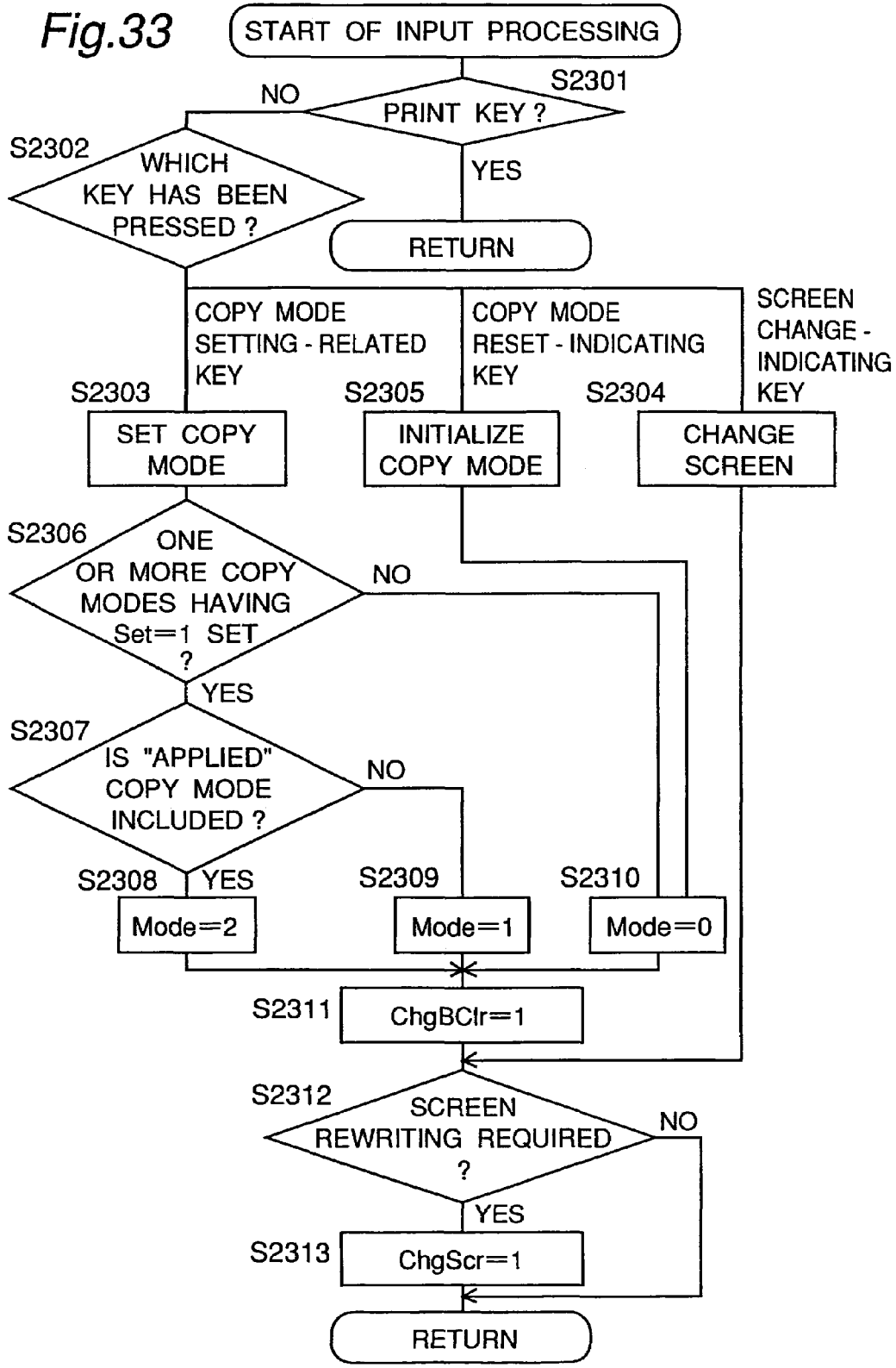
FIG. 33 is a chart showing a flow of input processing in the main flow of FIG. 30.

More specifically, as shown in FIG. 33, first, it is judged whether the panel input has been executed by means of the print key 61 (S2301). If the panel input has been executed by pressing the print key 61, the program immediately returns to the main routine because data of a demand for printing is processed at the subsequent steps shown in FIG. 31. If the panel input has been executed by means of a key other than the print key 61, a key matrix corresponding to the screen presently displayed is read to determine the kind of the pressed key, based on the position in which the touch switch 53 has been depressed (S2302).

If the pressed key is a key for setting a copy mode (for example, selection of paper size), a copy mode setting processing corresponding to the key is executed (S2303). More specifically, for the set copy mode, a value corresponding to the pressed key is written to the table of the RAM 58 shown in FIG. 29, and the flag Set is set to a value "1" to indicate that the subject copy mode has been set by the user. Then, with reference to each flag Set of the table, it is discriminated whether there are one or more copy modes currently set (S2306). If there are one or more copy modes set currently, then it is discriminated whether there are any copy modes that are classified into the "applied" function (S2307). If there is at least one copy mode that is classified into the "applied" function, it is determined that the current copy mode-set state is the "applied function-set state". Thus, the variable "Mode" is set to a value "2" (S2308). If none of them is classified into the "applied" function, it is determined that the current copy mode-set state is the "basic function-set state". Thus, the variable "Mode" is set to a value "1" (S2309). If it is determined at step S2306 that there are no currently set copy modes, it is determined that the current copy mode-set state is the initial state. Thus, the variable "Mode" is set to a value "0" (S2310).

If it is determined at step S2302 that the pressed key is a key indicating reset (initialization) of a copy mode, initialization of the copy mode is executed (S2305). That is, in the table of the RAM 58 shown in FIG. 29, the value of each copy mode is set to an initial value and the value of each of the flags Set is set to "0". Because the copy modes are initialized, the variable "Mode" is set to the value "0" indicating the initial state (S2310).

Subsequently to the setting of the variable "Mode" executed at step S2308, S2309, or S2310, the flag ChgBClr is set to "1" (S2311) to change the background color of the screen.

If it is determined at step S2302 that the pressed key is a key indicating a screen change, screen change processing corresponding to the key is executed (S2304). In this case, the flag ChgBClr is kept to be "0".

Then, it is discriminated whether the display screen should be rewritten as a result of the setting of the copy mode, the reset thereof or the screen change (S2312). If it is necessary to rewrite the display screen, the ChgScr is set to "1" (S2313) to rewrite the screen. If it is unnecessary to rewrite the display screen, the ChgScr is kept to be "0".

(3) Then, screen display processing to rewrite the screen data and change the background color is executed in accordance with the kind of the panel input (S2104).

More specifically, as shown in FIG. 34, it is discriminated whether the flag ChgScr has been set to "1", namely, whether the screen data should be rewritten, or changed (S2401). If the flag ChgScr has been set to "1", the program goes to step S2402 at which the screen data corresponding to the replacement screen is read from the VRAM 57 and then, the screen data is outputted to the liquid crystal display device 52 (S2402). As a result, in correspondence to the panel input, the screen data is rewritten. On the other hand, if the flag ChgScr has been set to "0", it is unnecessary to rewrite the screen data. Thus, the program goes to step S2403. It is determined at step S2403 whether or not the flag ChgBClr has been set to "1", namely, it is discriminated whether the background color of the screen should be changed. If the flag ChgBClr has been set to "1", indicating change of the background color of the screen, a color value corresponding to the value of the variable "Mode" is read from the RAM 58, and then the component values of each of the components R, G, and B corresponding to the color value are read from the color palette 63. The read component values are supplied to the liquid crystal display device 52 (S2404). As a result, a background color corresponding to the current copy mode-set state is displayed on the screen. On the other hand, if the flag ChgBClr has a value "0", it is unnecessary to change the background color. Thus, the program goes to step S2405. At step S2405, the flags ChgScr and ChgBClr are cleared to "0", respectively.

(4) Thereafter, the program goes to step S2105 of FIG. 31 at which information of the copy mode set by the user is transmitted to the print head portion 31.

(5) Then, it is discriminated whether the print key has been pressed by the user (S2106). If the print key has not been pressed, the program returns to step S2102 at which the CPU 55 waits for the panel input. If the print key has been pressed, the program goes to step S2107 at which an instruction to start printing is transmitted to the print head portion 31.

(6) Then, at step S2108, the CPU 55 waits until it receives a printing termination signal from the print head portion 31. When the printing terminates and the CPU 55 receives the printing termination signal from the print head portion 31, the program returns to step S2102.

(7) Then, if the panel input is executed again at step S2102, the CPU 55 executes the processing at each of steps S2103–S2108 repeatedly.

As described above, in the fourth embodiment, the background color of the screen is changed according to whether the current copy mode-set state is the copy modeunset state, the basic function-set state or the applied function-set state. Therefore, only by seeing the background color of the screen, the user can easily recognize visually which of the basic function and the applied function has been set or that neither the former nor the latter has been set. Consequently, the user can be allowed to reduce operation mistakes.

The copying machine may be arranged such that in the applied function-set state, the color value changes gradually from 64 to 127 according to the panel input and that the background color of the screen changes in correspondence to the change of the color value. For example, the background color of the screen may be changed gradually from pale blue to dark blue according to the key input on the applied screen. However, use of too many background colors makes it difficult for the user to distinguish the background colors from one another. Accordingly, it is preferable to limit the number and kind of background colors to a range in which the user can distinguish the background colors from one another easily.

Fifth Embodiment

Another example of the display control processing executed by the CPU 55 will be described below with reference to FIGS. 29, 31–32, and 34–39.

Figure 35:
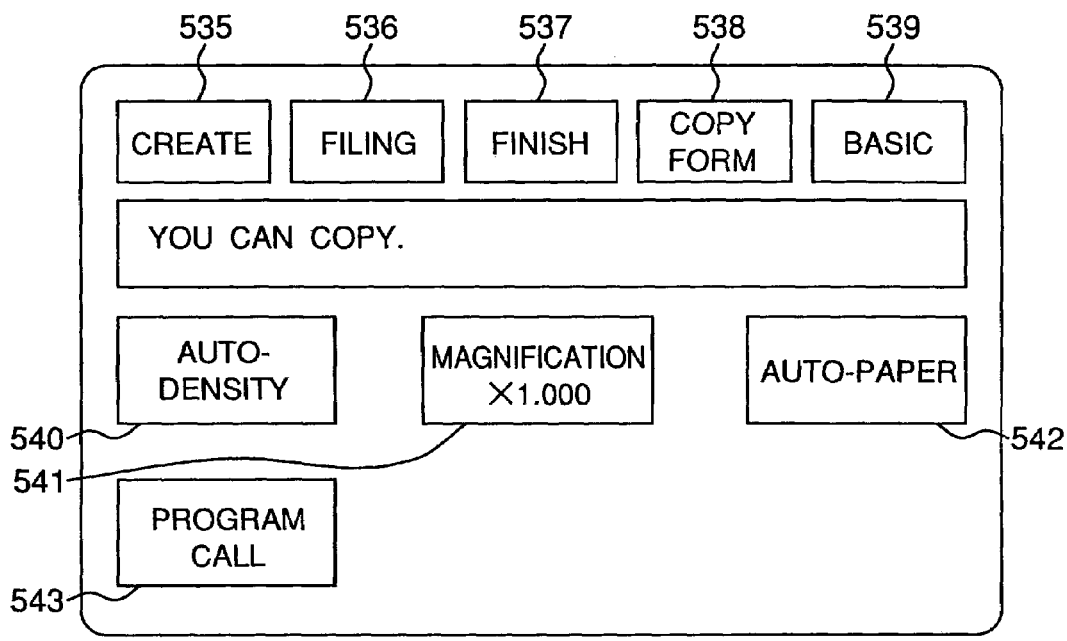
FIG. 35 shows a screen of a liquid crystal display device of an operation panel section in a fifth embodiment of the present invention.

With exceptions, reference numerals and symbols which are used for description of the fifth embodiment are the same as those which are used in the embodiments described previously. In the fifth embodiment, owing to the operation of the CPU 55, a program call key 543 is displayed on a key input screen of the liquid crystal display device 52, as shown in FIG. 35. Upon pressing of the program call key 543 by the user, the key input screen is switched to a program-calling screen shown in FIG. 36. By pressing a desired program memory key, namely, a program 1 key 544, a program 2 key 545, or a program 3 key 546, the user can call the corresponding program 1, 2, or 3 registered in the RAM 58, thus immediately placing the machine in a copy mode-set state written to the called program 1, 2 or 3. The copy mode-set states are preset in the programs 1–3 by the user's entering, through an operation panel, copy mode information such as the number of copies, paper sizes, copying magnifications, density, and so forth (see FIG. 29).

As shown in FIG. 37, the RAM 58 has not only the table shown in FIG. 29 but also a table associating various copy mode-set states (indicated by a variable "Mode1") with color values indicating background colors of the screen of the liquid crystal display device 52. A "program-uncalled state" (Mode=0) refers to a state in which no programs have been called. A "program 1-called state" (Mode=1) refers to a state in which the program 1 has been called and the value of each copy mode has been set according to the contents of the program 1. A "program 2-called state" (Mode=2) refers to a state in which the program 2 has been called and the value of each copy mode has been set according to the contents of the program 2. A "program 3-called state" (Mode=3) refers to a state in which the program 3 has been called and the value of each copy mode has been set according to the contents of the program 3. Color values 3, 16, 64, and 127 correspond to the "program uncalled state" (Mode=0), the "program 1-called state" (Mode=1), the "program 2-called state" (Mode=2), and the "program 3-called state" (Mode=3), respectively. In executing display control processing which will be described later, the value of the variable "Mode" is switched according to the relevant copy mode-set state, and a color represented by a color value corresponding to the value of the variable "Mode" is adopted as the background color of the screen.

In the fifth embodiment, a main routine of the display control processing which is executed by the CPU 55 is similar to that shown in FIG. 31. Therefore, the main routine in the fifth embodiment is described with reference to FIG. 31.

(1) When the power source of the main body of the copying machine is turned on, the CPU 55 executes processing of initializing the copy mode and the flags (S2101).

Figure 39:
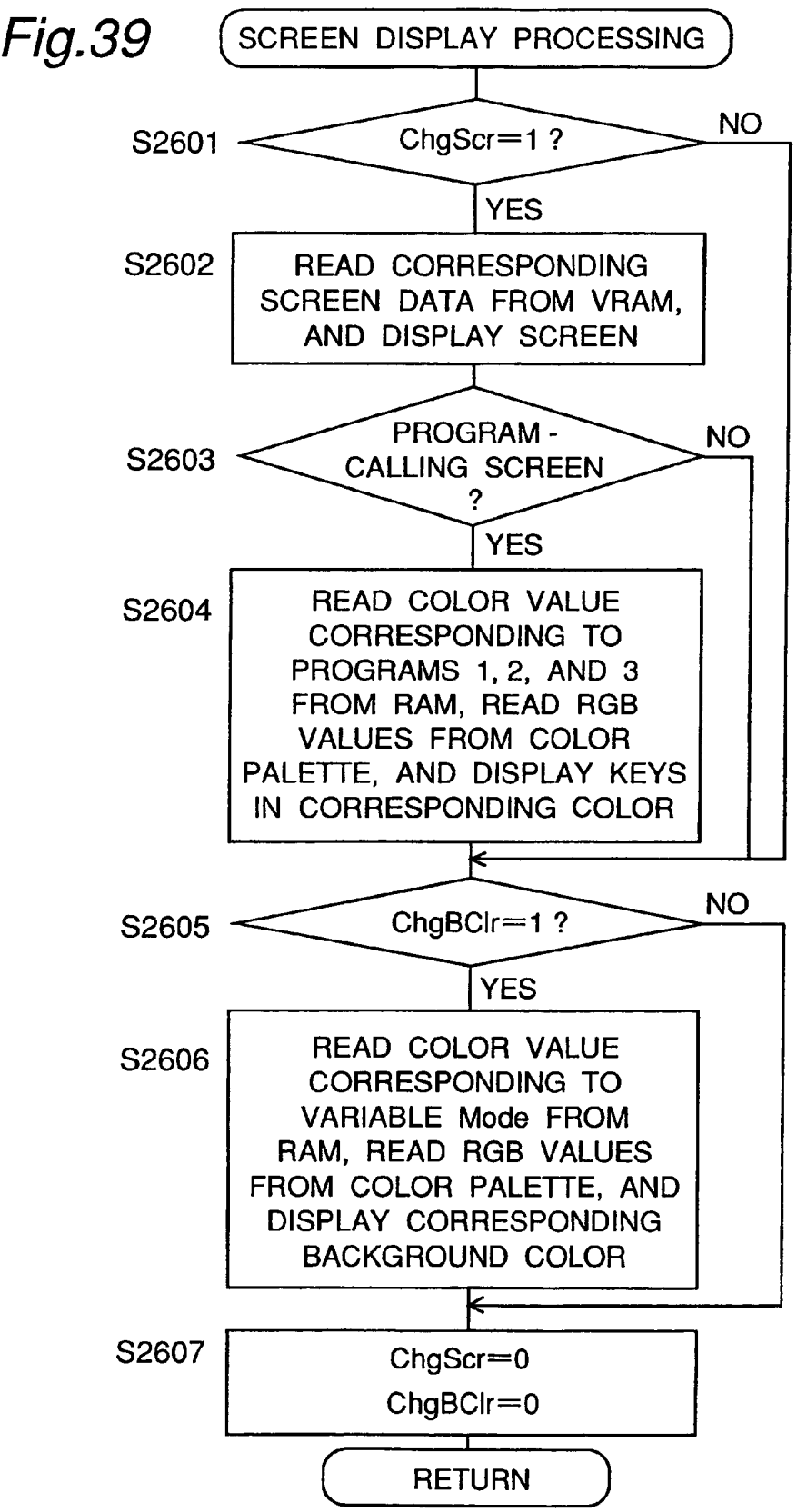
FIG. 39 is a chart showing a flow of screen display processing included in the display control processing flow of the fifth embodiment.

More specifically, as shown in FIG. 32, first, the CPU 55 itself is initialized (S2201). Then, the copy modes are initialized (S2202). That is, the value of each copy mode in the RAM 58 is set to an initial value. Then, interruptions from the print head portion 31, the touch switch 53, the print key 61 and the other parts are enabled (S2203). Then, to display an initial screen (see FIG. 35), the variable "Mode" is set to "0" and the flag ChgScr is set to "1" (S2204), and a screen display processing is executed for rewriting the screen data and changing the background color (S2205). In the fifth embodiment, as shown in FIG. 39, it is first discriminated whether the flag ChgScr has been set to "1", namely, whether the screen data should be rewritten (S2601). In this case, because the flag ChgScr has been set to "1" in advance, the program goes to step S2602 at which screen data corresponding to a replacement screen (which is a screen to be newly displayed, and is the initial screen at this time.) is read from the VRAM 57 and then, the screen data is outputted to the liquid crystal display device 52 (S2602). Then, it is discriminated whether a replacement screen is a program-calling screen (see FIG. 36) (S2603). Because the replacement screen is not the program-calling screen in the initial state, the program goes to step S2605 at which it is discriminated whether the flag ChgBClr has been set to "1" (S2605). The flag ChgBClr is set to "1" in the initial state. Thus, a color value ("3") corresponding to the value of the variable "Mode" ("0" in the initial state) is read from the RAM 58, and the component values of each of the components R, G, and B corresponding to the color value are read from the color palette 63 and supplied to the liquid crystal display device 52 (S2606). As a result, the background color (pale blue now) corresponding to the initial state is displayed on the screen. Then, the flags ChgScr and ChgBClr are cleared to "0" (S2607).

(2) Then, it is judged whether the user has performed a panel input, or an input operation through the operation panel section 50 (S2102). If the panel input has not been performed, the program goes to step S2109 at which "other processing" is executed, and the CPU 55 waits for the panel input. If the panel input is performed, input processing for determining the contents of the panel input is executed (S2103).

Figure 38:
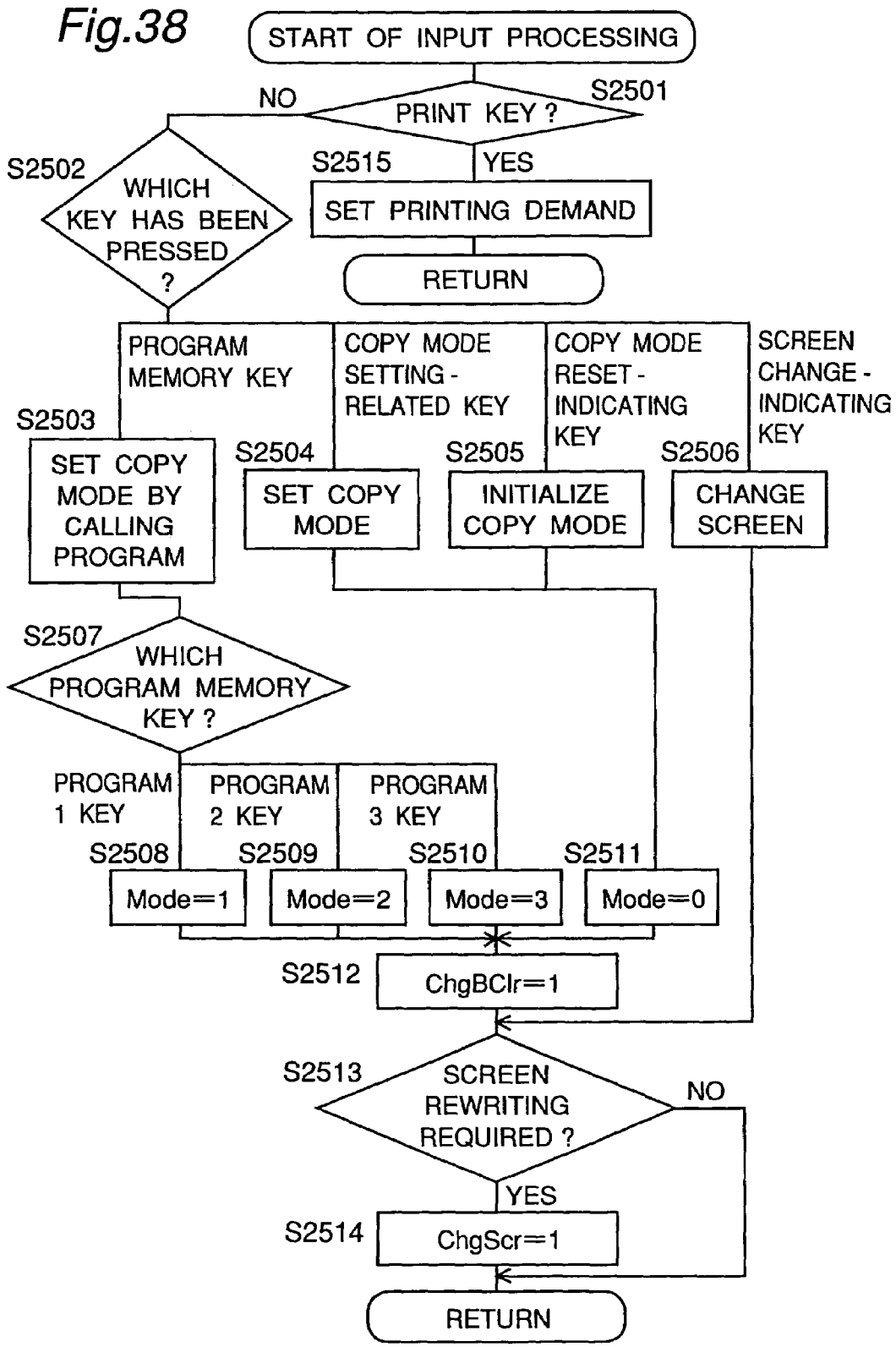
FIG. 38 is a chart showing a flow of input processing included in a display control processing flow of the fifth embodiment.

In the fifth embodiment, as shown in FIG. 38, it is first discriminated whether the panel input has been executed by pressing the print key 61 (S2501). If the panel input has been executed by depressing the print key 61, a demand for printing is set (S2515) and the program immediately returns to the main routine because the demand for printing is processed at the subsequent steps shown in FIG. 31. If the panel input has been executed by means of a key other than the print key 61, a key matrix corresponding to the screen presently displayed is read to determine the kind of the pressed key, based on the position in which the touch switch 53 has been depressed (S2502).

If the pressed key is a program memory key, namely, any one of the program 1 key 544, the program 2 key 545, and the program 3 key 546 on the program-calling screen (FIG. 36), the relevant program 1, 2 or 3 is called to perform processing of setting copy modes registered on the program 1, 2 or 3 (S2503). Then, it is judged which of the program 1 key 544, the program 2 key 545, and the program 3 key 546 has been pressed (S2507). If the pressed key is the program 1 key, the variable "Mode" is set to the value "1" (S2508). If the pressed key is the program 2, the variable "Mode" is set to the value "2" (S2509). If the pressed key is the program 3 key, the variable "Mode" is set to the value "3" (S2510).

If it is determined at step S2502 that the pressed key is a copy mode setting-related key (e.g., selection of paper size), copy mode-setting processing corresponding to the key is executed (S2504). More specifically, for the copy mode designated by the pressed key, a value entered through the panel is written to the RAM 58. As a result, it is determined that the called program has been altered, so that the variable "Mode1" is set to "0" (S2511) to indicate that no programs are called currently.

If it is determined at step S2502 that the pressed key is a key indicating reset (initialization) of a copy mode, initialization of the copy mode is executed (S2505). That is, in the table of the RAM 58, the value of each copy mode is set to an initial value. Because the copy modes are initialized, the variable "Mode" is set to the value "0" indicating the initial state (S2511).

Subsequently to the setting of the variable "Mode" executed at step S2508, S2509, S2510, or S2511, the flag ChgBClr is set to "1" (S2512) to change the background color of the screen.

If it is determined at step S2502 that the pressed key is a key indicating a screen change, screen change processing corresponding to the key is executed (S2506). In this case, the flag ChgBClr is kept to be "0".

Then, it is discriminated whether the display screen should be rewritten as a result of the program calling, the copy mode setting, the reset thereof or the screen change (S2513). If it is necessary to rewrite the display screen, the ChgScr is set to "1" (S2514) to rewrite the screen. If it is unnecessary to rewrite the display screen, the ChgScr is kept to be "0".

(3) Then, screen display processing to rewrite the screen data and change the background color is executed in accordance with the kind of the panel input (S2104).

More specifically, as shown in FIG. 39, it is discriminated whether the flag ChgScr has been set to "1", namely, whether the screen data should be rewritten, or changed (S2601). If the flag ChgScr has been set to "1", the program goes to step S2602 at which the screen data corresponding to a replacement screen is read from the VRAM 57 and then, the screen data is sent to the liquid crystal display device 52 (S2602). As a result, in correspondence to the panel input, the screen data is rewritten. Then, it is discriminated whether the replacement screen is the program-calling screen (FIG. 36) (S2603). If it is the program-calling screen, color values "16", "64", and "127" corresponding to the program 1, 2, and 3, respectively are read from the RAM 58, and the component values of each of the components R, G, and B corresponding to the color values are read from the color palette 63, and then, a rectangular region of each of the program 1 key 544, the program 2 key 545, and the program 3 key 546 is displayed in a corresponding color on the liquid crystal display device 52 (S2604). As a result, the user can easily distinguish the program memory keys from one another visually. If it is determined at step S2603 that the replacing screen is not the program-calling screen, the rectangular regions of the program keys are not displayed. Thus, the program goes to step S2605. If it is determined at step S2601 that the flag ChgBClr has been set to "1", it is unnecessary to rewrite the screen data. Thus, the program goes to step S2605.

It is determined at step S2605 whether the flag ChgBClr has been set to "1", i.e., whether the background color of the screen should be changed. If the flag ChgBClr has been set to "1", indicating change of the background color of the screen, a color value corresponding to the value of the variable "Model" is read from the RAM 58, and then the values of the components R, G, and B corresponding to the color value are read from the color palette 63. The read component values are supplied to the liquid crystal display device 52 (S2606). As a result, a background color corresponding to the current copy mode setting is displayed on the screen. On the other hand, if the flag ChgBClr has a value "0", it is unnecessary to change the background color. Thus, the program goes to step S2607. At step S2607, the flags ChgScr and ChgBClr are cleared to "0", respectively.

(4) Thereafter, the program goes to step S2105 of FIG. 31 at which information of the copy mode set by the user is transmitted to the print head portion 31.

(5) Then, it is discriminated whether the print key has been pressed by the user (S2106). If the print key has not been pressed, the program returns to step S2102 at which the CPU 55 waits for the panel input. If the print key has been pressed, the program goes to step S2107 at which an instruction to start printing is transmitted to the print head portion 31.

(6) Then, at step S2108, the CPU 55 waits until it receives a printing termination signal from the print head portion 31. When the printing terminates and the CPU 55 receives the printing termination signal from the print head portion 31, the program returns to step S2102.

(7) Then, if the panel input is newly executed at step S2102, the CPU 55 executes the processing at each of steps S2103–S2108 repeatedly.

As described above, in the display control processing of the fifth embodiment, the background color of the screen is changed according to the called program. Thus, by seeing the background color of the screen and without performing any special operation, the user can visually recognize which of the programs has been called. This is convenient to the user. Consequently, erroneous operations of the machine by the user will be reduced.

In the fifth embodiment three programs 1, 2, and 3 are called. But the present invention may be applied to a copying machine capable of calling more programs. However, if too many background colors are used, the user finds it difficult to distinguish the background colors from one another. Accordingly, it is preferable to limit the number and kind of the background colors such that the user can easily distinguish the background colors from one another.

Sixth Embodiment

Another example of the display control processing which is executed by the CPU 55 will be described below with reference to FIGS. 29, 31–32, 34–36, and 39–41. The sixth embodiment is a combination of the fourth and fifth embodiments. Thus, reference numerals and symbols used for description of the sixth embodiment are the same as those which are used in the fourth and fifth embodiments.

Figure 36:
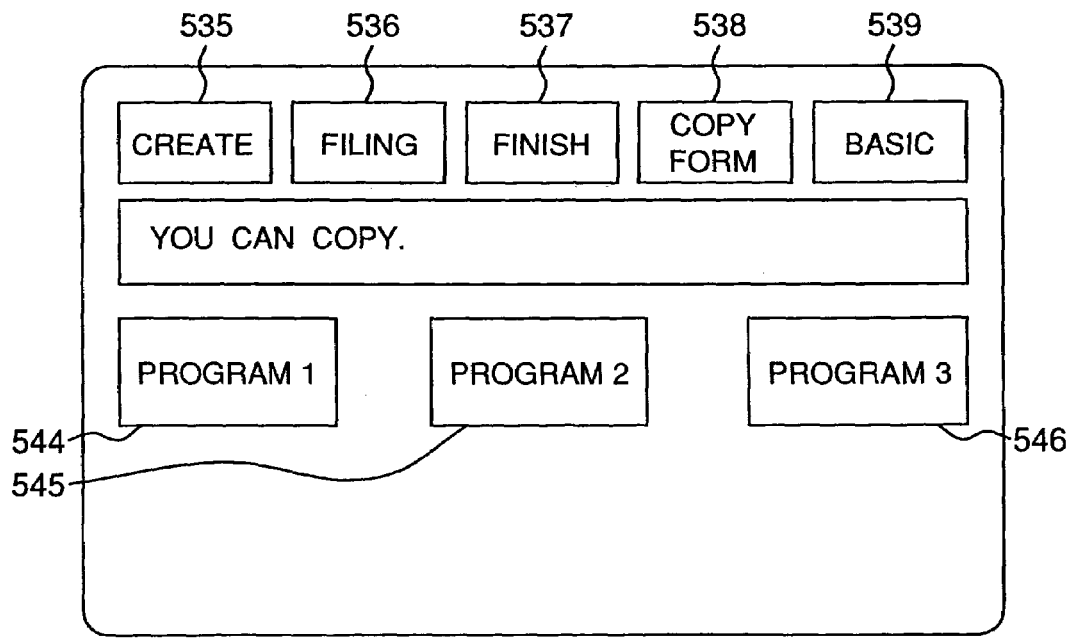
FIG. 36 shows a "program call" screen of the liquid crystal display device of the operation panel section in the fifth embodiment.

In the sixth embodiment, as in the fifth embodiment, the program calling key 543 is displayed on the key input screen of the liquid crystal display device 52, as shown in FIG. 35. Upon pressing the program calling key 543, the key input screen is switched to the program-calling screen as shown in FIG. 36. By pressing a desired program memory key, namely, a program 1 key 544, a program 2 key 545, or a program 3 key 546, the user can call the corresponding program 1, 2, or 3 registered in the RAM 58, thus immediately placing the machine in a copy mode-set state written to the called program 1, 2 or 3. The copy mode-set states are preset in the programs 1–3 by the user's entering, through an operation panel, copy mode information such as the number of copies, paper sizes, copying magnifications, density, and so forth (see FIG. 29).

The RAM 58 has a backup battery and stores data such as (i) various copy mode-set states and (ii) color values corresponding to the respective set copy mode states.

(i) The RAM 58 has a table indicating the various copy mode-set states, as shown in FIG. 29. The table contains classification data indicating whether each copy mode of the copying machine belongs to a basic function (represented as "basic") or an applied function (represented as "applied"); copy modes (e.g., number of copies, paper size, copying magnification, and the like) thus classified; values currently set for the copy modes (the values indicate currently set contents of the copy modes including ON/OFF, and so forth); values of a flag Set indicating whether a copy mode has been set or not. For a copy mode set by the user, a value "0" is given to the flag Set. For a copy mode not set by the user, a value "1" is set on the flag Set. The value "1" is also an initial value of this flag.

(ii) As shown in FIG. 40, the RAM 58 also has a table for associating the various copy mode-set states (indicated by a value of variable "Mode") with color values indicating background colors of the screen of the liquid crystal display device 52. The "initial state" (Mode=0) refers to a state in which none of the copy modes is set and thus the value of the flag Set of each copy mode is "0". A "program 1-called state" (Mode=1) refers to a state in which the program 1 has been called and the value of each copy mode has been set according to the contents of the program 1. A "program 2-called state" (Mode=2) refers to a state in which the program 2 has been called and the value of each copy mode has been set according to the contents of the program 2. A "program 3-called state" (Mode=3) refers to a state in which the program 3 has been called and the value of each copy mode has been set according to the contents of the program 3. A "program-uncalled and applied function-set state" (Mode=4) refers to a state in which one or more copy modes are either set without calling a program or altered after calling a program, and the set or altered copy modes include a copy mode classified into the "applied" function in the table of FIG. 29. A "program-uncalled and basic function-set state" (Mode=5) refers to a state in which one or more copy modes are either set without calling a program or altered after calling a program, and all of the set or altered copy are classified into the "basic" function in the table of FIG. 29. A color value 3 corresponds to the "initial state" (Mode=0), a color value 16 corresponds to the "program 1-called state" (Mode=1), a color value 32 corresponds to the "program 2-called state" (Mode=2), a color value 64 corresponds to the "program 3-called state" (Mode=3), a color value 96 corresponds to the "program-uncalled and applied function-set state" (Mode=4), and a color value 127 corresponds to the "program uncalled and basic function-set state" (Mode=5). In executing display control processing which will be described later, the variable "Mode" is switched from one value to another according to the relevant copy mode-set state, and a color represented by a color value corresponding to the value of the variable "Model" is adopted as the background color of the screen.

In the sixth embodiment, a main routine of the display control processing which is executed by the CPU 55 is similar to that shown in FIG. 31. Therefore, the main routine in the sixth embodiment is described with reference to FIG. 3.

(1) When the copying machine is powered on, the CPU 55 executes processing of initializing the copy modes and the flags (S2101).

More specifically, as shown in FIG. 32, first, the CPU 55 itself is initialized (S2201). Then, the copy modes are initialized (S2202). At this time, in the table of the RAM 58 shown in FIG. 29, each copy mode is set to an initial value, and the flag Set is set to "0" for each copy mode. Then, interruptions from the print head portion 31, the touch switch 53, the print key 61 and other parts are enabled (S2203). Then, to display an initial screen (FIG. 28), the variable "Mode" is set to "0" and the flag ChgScr is set to "1" (S2204) to execute a screen display processing including rewriting the screen data and changing the background color (S2205). In this sixth embodiment, as shown in FIG. 39, it is first discriminated whether the flag ChgScr has been set to "1", namely, whether the screen data should be rewritten (S2601). In this case, because the flag ChgScr has been set to "1" in advance, the program goes to step S2602 at which screen data corresponding to a replacement screen (which is the initial screen at this time.) is read from the VRAM 57 and then, the screen data is outputted to the liquid crystal display device 52 (S2602). Then, it is discriminated whether the replacing screen is the program-calling screen (FIG. 36) (S2603). Because the replacing screen is not the program-calling screen in the initial state, the program goes to step S2605 at which it is discriminated whether the flag ChgBClr has been set to "1" (S2605). Because the flag ChgBClr is set to "1" in the initial state, a color value ("3") corresponding to the value ("0" in initial state) of the variable "Model" is read from the RAM 58, then, the value of each of the components R, G, and B corresponding to the color value is read from the color palette 63, and then, the component values are supplied to the liquid crystal display device 52 (S2606). As a result, a background color (pale blue) corresponding to the initial state is displayed on the screen. Then, the flags ChgScr and ChgBClr are cleared to "0" (S2607).

(2) Then, it is judged whether the user has performed a panel input (S2102). If the panel input has not been performed, the program goes to step S2109 at which "other processing" is executed, and the CPU 55 waits for the panel input. If the panel input is performed, the following input processing for determining the contents of the panel input is executed (S2103).

Figure 41:
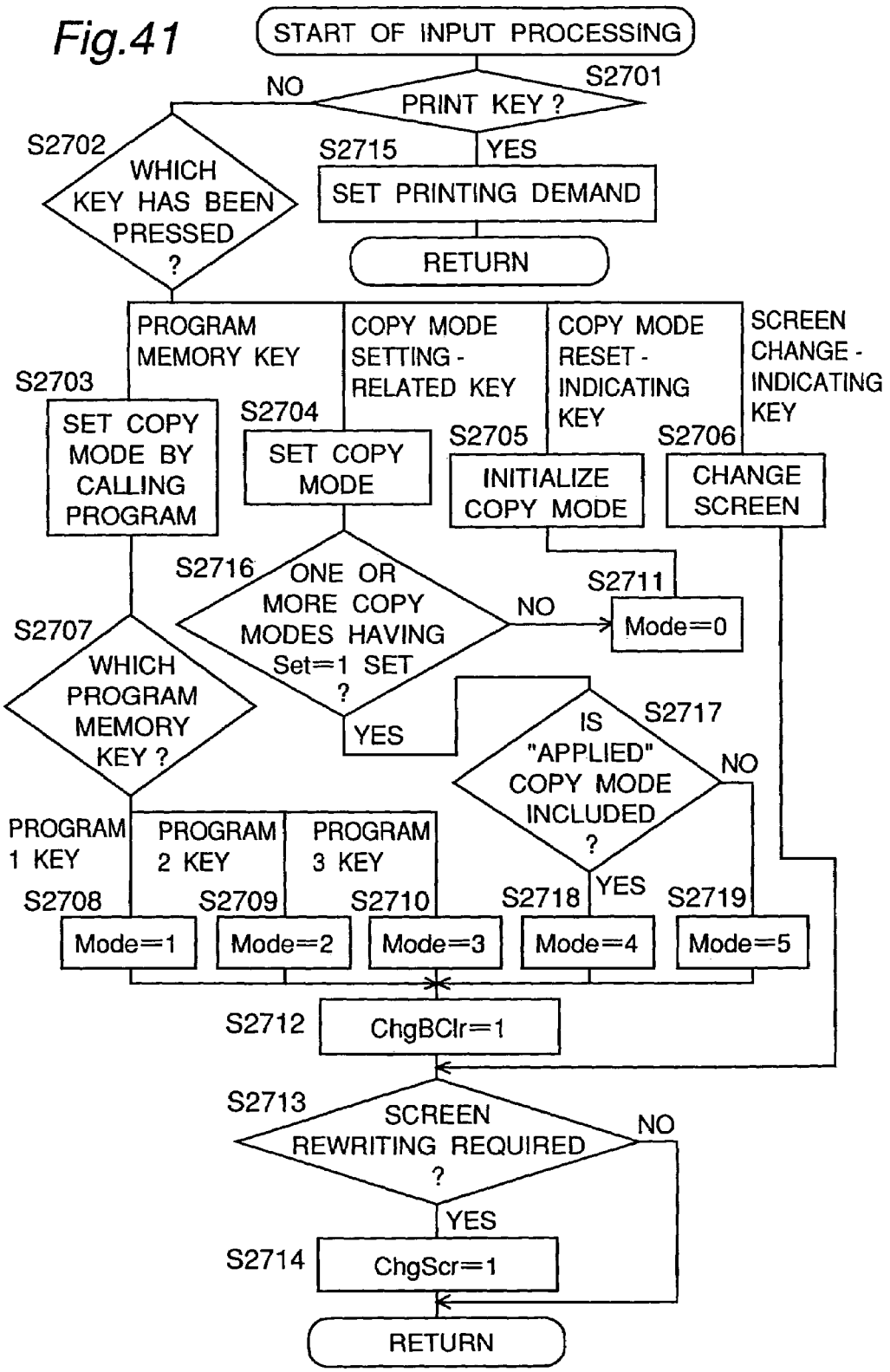
FIG. 41 is a chart showing a flow of input processing in a display control processing flow of the sixth embodiment.
Figure 42A:
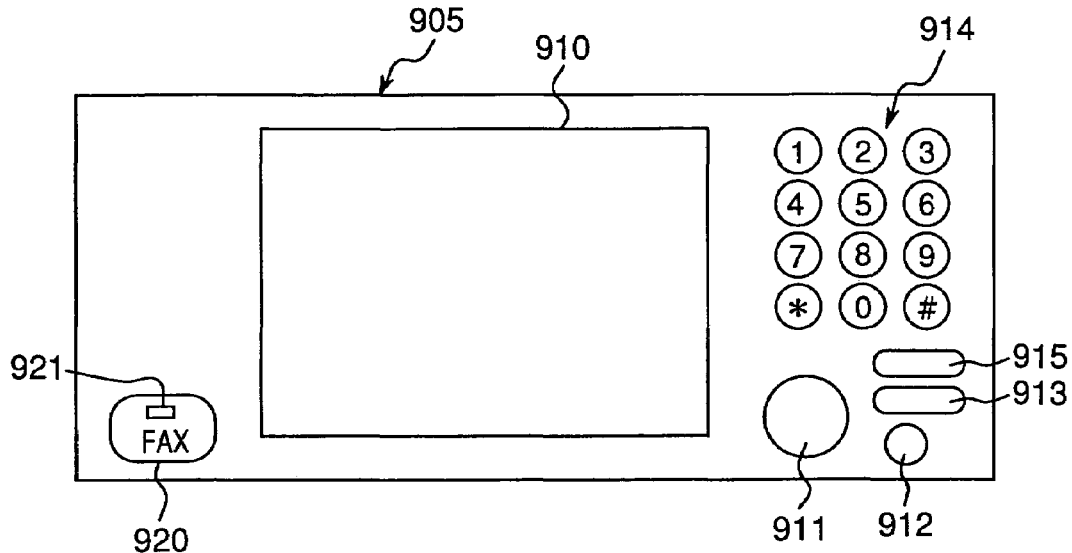
FIGS. 42A and 42B are explanatory views for describing the problem of a conventional composite apparatus.
Figure 42B:
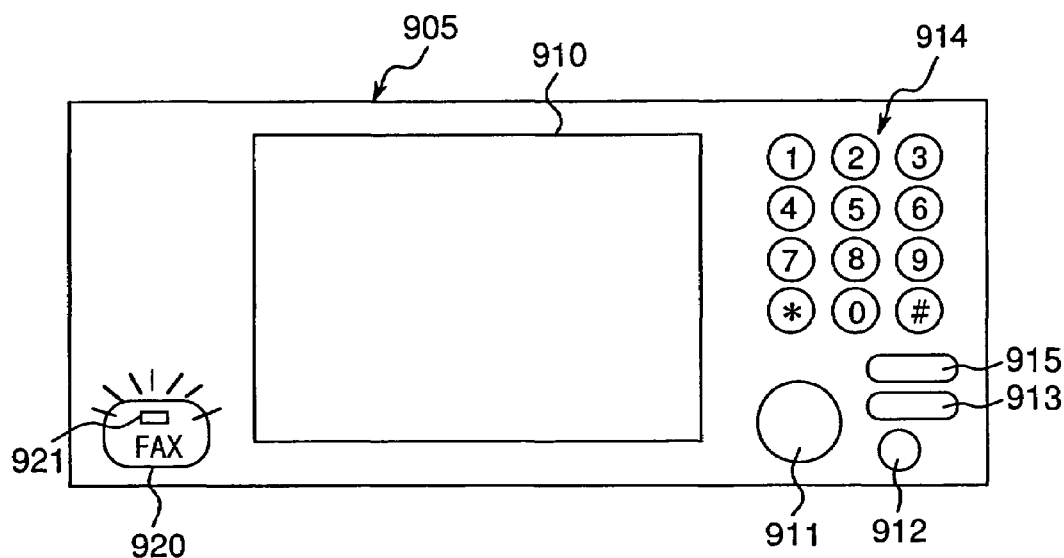

In the sixth embodiment, as shown in FIG. 41, it is first discriminated whether the panel input has been executed by pressing the print key 61 (S2701). If the panel input has been executed by depressing the print key 61, a demand for printing is set (S2715) and the program immediately returns to the main routine because the demand for printing is processed at the subsequent steps shown in FIG. 31. If the panel input has been executed by means of a key other than the print key 61, a key matrix corresponding to the screen presently displayed is read to determine the kind of the pressed key, based on the position in which the touch switch 53 has been depressed (S2702).

If the pressed key is a program memory key, namely, any one of the program 1 key 544, the program 2 key 545, and the program 3 key 546 on the program-calling screen (FIG. 36), the relevant program 1, 2 or 3 is called to perform processing of setting copy modes registered on the program 1, 2 or 3 (S2703). Then, it is judged which program memory key has been pressed (S2707). If the pressed key is the program 1 key, the variable "Model" is set to the value "1" (S2708). If the pressed key is the program 2, the variable "Model" is set to the value "2" (S2709). If the pressed key is the program 3 key, the variable "Mode" is set to the value "3" (S2710).

If the pressed key is a key for setting a copy mode (for example, selection of paper size), a copy mode setting processing corresponding to the key is executed (S2704). More specifically, for the designated copy mode, a value corresponding to the pressed key is written to the table of the RAM 58 shown in FIG. 29, and the flag Set is set to a value "1" to indicate that the subject copy mode has been set by the user. Then, with reference to each flag Set in the table, it is discriminated whether there are one or more copy modes currently set (S2716). If there are one or more copy modes which are currently set, then it is discriminated whether the currently set copy modes include a copy mode that are classified into the "applied" function (S2717). If there is at least one copy mode that is classified into the "applied" function, it is determined that the current copy mode-set state is the "program-uncalled and applied function-set state". Thus, the variable "Mode" is set to "4" (S2718). If none of them are classified into the "applied" function, it is determined that the current copy mode-set state is the "program-uncalled and basic function-set state". Thus, the variable "Mode" is set to "5" (S2719). If it is determined at step S2716 that there are no currently set copy modes, it is determined that the current copy mode-set state is the initial state. Thus, the variable "Mode" is set to a value "0" (S2711).

If it is determined at step S2702 that the pressed key is a key indicating reset (initialization) of the copy modes, initialization of the copy modes is executed (S2705). That is, in the table of the RAM 58, the value of each copy mode is set to an initial value. Because the copy modes are initialized, the variable "Mode" is set to the value "0" indicating the initial state (S2711).

Subsequently to the setting of the variable "Mode" executed at step S2708, S2709, S2710, S2711, S2718, or S2719, the flag ChgBClr is set to "1" (S2712) to change the background color of the screen.

If it is determined at step S2702 that the pressed key is a key indicating a screen change, screen change processing corresponding to the key is executed (S2706). In this case, the value of the flag ChgBClr remains "0".

Then, it is discriminated whether the display screen is required to be rewritten as a result of the program calling, the copy mode setting, the reset thereof or the screen change (S2713). If it is necessary to rewrite the display screen, the ChgScr is set to "1" (S2714) to rewrite the screen. If it is unnecessary to rewrite the display screen, the ChgScr is kept to be "0".

(3) Then, screen display processing to rewrite the screen data and change the background color is executed in accordance with the panel input (S2104).

More specifically, as shown in FIG. 39, it is discriminated whether the flag ChgScr has been set to "1", namely, whether the screen data should be rewritten, or changed (S2601). If the flag ChgScr has been set to "1", the program goes to step S2602 at which the screen data corresponding to a replacement screen is read from the VRAM 57 and then, the screen data is sent to the liquid crystal display device 52 (S2602). As a result, in correspondence to the panel input, the screen data is rewritten. Then, it is discriminated whether the replacement screen is the program-calling screen (FIG. 36) (S2603). If it is the program-calling screen, color values "16", "64", and "127" corresponding to the programs 1, 2, and 3, respectively, are read from the RAM 58, and the component values of each of the components R, G, and B corresponding to the color values are read from the color palette 63, and then, a rectangular region of each of the program 1 key 544, the program 2 key 545, and the program 3 key 546 is displayed in a corresponding color on the liquid crystal display device 52 (S2604). As a result, the user can easily distinguish the program memory keys from one another visually. If it is determined at step S2603 that the replacing screen is not the program-calling screen, the rectangular regions of the program keys are not displayed. Thus, the program goes to step S2605. If it is determined at step S2601 that the flag ChgBClr has been set to "1", it is unnecessary to rewrite the screen data. Thus, the program goes to step S2605.

It is determined at step S2605 whether the flag ChgBClr has been set to "1", i.e., whether the background color of the screen should be changed. If the flag ChgBClr has been set to "1", indicating change of the background color of the screen, a color value corresponding to the value of the variable "Model" is read from the RAM 58, and then the values of the components R, G, and B corresponding to the color value are read from the color palette 63. The read component values are supplied to the liquid crystal display device 52 (S2606). As a result, a background color corresponding to the current copy mode setting is displayed on the screen. On the other hand, if the flag ChgBClr has a value "0", it is unnecessary to change the background color. Thus, the program goes to step S2607. At step S2607, the flags ChgScr and ChgBClr are cleared to "0", respectively.

(4) Thereafter, the program goes to step S2105 of FIG. 31 at which information of the copy mode set by the user is transmitted to the print head portion 31.

(5) Then, it is discriminated whether the print key has been pressed by the user (S2106). If the print key has not been pressed, the program returns to step S2102 at which the CPU 55 waits for the panel input. If the print key has been pressed, the program goes to step S2107 at which an instruction to start printing is transmitted to the print head portion 31.

(6) Then, at step S2108, the CPU 55 waits until it receives a printing termination signal from the print head portion 31. When the printing terminates and the CPU 55 receives the printing termination signal from the print head portion 31, the program returns to step S2102.

(7) Then, if the panel input is newly executed at step S2102, the CPU 55 executes the processing at each of steps S2103–S2108 repeatedly.

As described above, in the display control processing of the sixth embodiment, the background of the screen is switched from one color to another, according to the current copy mode-set state of the machine, namely, according to whether the machine is in the initial copy mode-set state (copy mode unset state), or in the state that any one of the programs has been called, or in the basic function-set state, or the applied function-set state. Therefore, similar effects to those of the preceding embodiments are obtained.

In the above embodiments, the displayed color is changed according to the operational mode. Alternatively, a same color may be used, and brightness (luminance) and/or density of the color may be changed in correspondence with the operational mode.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image forming apparatus comprising:
   an image forming section for forming an image in a plurality of operational modes;
   a display device for displaying information on a screen thereof, the display device displaying information on a predetermined area of the screen in a plurality of colors in response to a color display signal; and
   a controller for determining the operational mode of the image forming apparatus and providing a color display signal to the display device to change the color to be displayed on said predetermined area of the screen according to the determined operational mode.

2. An image forming apparatus according to claim 1, further comprising:
   input means for entering an identification signal for identifying an operator,
   wherein said plurality of operational modes are set according to the identification signal entered from said input means.

3. An image forming apparatus according to claim 1, wherein said image forming section is capable of sequentially executing a plurality of jobs, and each job is associated with one of said plurality of operational modes.

4. An image forming apparatus according to claim 1, further comprising:
an image reading section for reading an image of a document and creating image data; and
a data receiving section for receiving image data,
wherein said plurality of operational modes include a copying operation in which an image is formed based on the image data created by said image reading section and a printing operation in which an image is formed based on the image data received by said data receiving section.

5. An image forming apparatus according to claim 4, further comprising:
a facsimile control section for sending and receiving image data through communication lines,
wherein said plurality of operational modes include a facsimile operation which is executed by using said facsimile control section.

6. An image forming apparatus according to claim 1, wherein said controller sets a background color of said predetermined area of the screen in reponse to the color display signal.

7. An image forming apparatus according to claim 1, further comprising:
setting means for setting an image forming condition regarding at least one of the operational modes,
wherein said plurality of operational modes include a reset mode in which setting has not been performed by said setting means and at least one mode in which setting has been performed by said setting means.

8. An image forming apparatus according to claim 7, wherein said setting means is also capable of setting a second image forming condition, and said plurality of operational modes include a second setting mode in which said second image forming condition has been set.

9. An image forming apparatus according to claim 1, further comprising:
program registration means for registering a plurality of combinations of image forming conditions; and
setting means for setting an operational mode by calling a combination of image forming conditions registered by said program registration means.

10. An image forming apparatus according to claim 1, further comprising:
first setting means for setting a first image forming condition regarding a first function, and
second setting means for setting an image forming condition regarding a second function in association with said first image forming condition.

11. An image forming apparatus according to claim 10, wherein the first image forming condition and the second image forming condition are simultaneously displayed on said predetermined area and another area of the screen of said display device, and said predetermined area and the other area are displayed in different colors.

12. An image forming apparatus according to claim 10, wherein a background color of each of said predetermined area and the other area is set according to the color display signal.

13. An image processing device comprising:
an image processing section for processing an image in a plurality of operational modes;
a display device for displaying information on a screen thereof, the display device displaying information on a predetermined area of the screen in a plurality of colors in reponse to a color display signal; and
a controller for determining the operational mode of the image processing device and providing a color display signal to the display device to change the color to be displayed on said predetermined area of the screen according to the determined operational mode.

14. An image processing device according to claim 13, further comprising:
input means for entering an identification signal for identifying an operator,
wherein said plurality of operational modes are set according to the identification signal entered from said input means.

15. An image processing device according to claim 13, wherein said image processing section is capable of sequentially executing a plurality of jobs, and each job is associated with one of said plurality of operational modes.

16. An image processing device according to claim 13, further comprising:
an image reading section for reading an image of a document and creating image data; and
a data receiving section for receiving image data, wherein said plurality of operational modes include a copying operation in which an image is formed based on the image data created by said image reading section and a printing operation in which an image is formed based on the image data received by said data receiving section.

17. An image processing device according to claim 16, further comprising:
a facsimile control section for sending and receiving the image data through communication lines,
wherein said plurality of operational modes include a facsimile operation which is executed by using said facsimile control section.

18. An image processing device according to claim 13, wherein said controller sets a background color of said predetermined area of the screen in reponse to color display signal.

19. An image processing device according to claim 13, further comprising:
setting means for setting an image processing condition regarding at least one of the operational modes,
wherein said plurality of operational modes include a reset mode in which setting has not been performed by said setting means and at least one mode in which setting has been performed by said setting means.

20. An image processing device according to claim 19, wherein said setting means is also capable of setting a second image processing condition, and said plurality of operational modes include a second setting mode in which said second image processing has been set.

21. An image processing device according to claim 13, further comprising:
program registration means for registering a plurality of combinations of image processing conditions; and
setting means for setting an operational mode by calling a combination of image processing conditions registered by said program registration means.

22. An image processing device according to claim 13, further comprising:
first setting means for setting a first image processing condition regarding a first function, and second setting means for setting a second image processing condition regarding a second function in association with said first image processing condition.

23. An image processing device according to claim 22, wherein the first image processing condition and the second image processing condition are simultaneously displayed on said predetermined area and another area of the screen of said display device, and said predetermined area and the other area are displayed in different colors.

24. An image processing device according to claim 22, wherein a background color of each of said predetermined area and the other area is set according to the color display signal.

25. An image processing apparatus comprising:
an input section for inputting an identification code to identify a user;
a display device for displaying information on a screen thereof, the display device displaying information on a predetermined area of the screen in a plurality of colors in response to a color display signal;
a memory device for storing color information in association with a plurality of identification codes; and
a controller for, when the identification code is input via the input section, providing a color display signal to the display device to change the color to be displayed on the predetermined area of the screen according to color information stored in the memory device in association with the inputted identification code.

26. An image processing apparatus comprising:
an image processing section for sequentially processing a plurality of jobs;
a display device for displaying information on a screen thereof, the display device displaying information on a predetermined area of the screen in a plurality of colors in response to a color display signal; and
a controller for, when the job to be processed by the image processing section is switched to a new job, providing a color display signal to the display device to change the color to be displayed on the predetermined area of the screen according to the new job.

27. An image processing apparatus operable in a plurality of operational modes, comprising:
selection means for selecting one of the plurality of operational modes;
a display device for displaying information on a screen thereof, the display device displaying information on a predetermined area of the screen in a plurality of colors in response to a color display signal; and
a controller for, when the operational mode is selected by the selection means, providing a color display signal to the display device to change the color to be displayed on the predetermined area of the screen according to the selected operational mode.

28. An image processing apparatus according to claim 27, wherein the plurality of operational modes include a copying operation and a facsimile operation.

29. An image processing apparatus comprising:
an image processing section for processing an image according to an image processing condition having a plurality of parameters;
first setting means for setting a state of one parameter of the image processing condition according to a user's instruction;
second setting means for automatically setting a state of another parameter of the image processing condition according to the state of the one parameter set by the first setting means;
a display device for displaying information on a screen thereof, the display device displaying information regarding a state of each parameter on a respective sectional area of the screen in a plurality of colors in response to a color display signal; and
a controller for providing a color display signal to the display device to change the color to be displayed on each area of the screen based on whether the state of the parameter corresponding to the area is set by the first setting means or the second setting means.

30. An image processing apparatus comprising:
an image processing section for processing an image according to an image processing condition having a plurality of parameters;
setting means for setting the image processing condition, wherein the plurality of parameters are classified into a basic function and an application function;
a display device for displaying information on a screen thereof, the display device displaying information on a predetermined area of the screen in a plurality of colors in response to a color display signal; and
a controller for providing a color display signal to the display device to change the color to be displayed on the predetermined area of the screen based on whether the image processing condition set by the setting means includes a parameter regarding the basic function or the application function.

31. An image processing apparatus comprising:
an image processing section for processing an image according to an image processing condition having a plurality of parameters;
a memory device for storing a plurality of programs which respectively store different image processing conditions therein;
selection means for selecting one of the plurality of programs stored in the memory device; and
a display device for displaying information on a screen thereof, the display device displaying information on a predetermined area of the screen in a plurality of colors in response to a color display signal;
a controller for providing a color display signal to the display device to change the color to be displayed on the predetermined area of the screen according to the program selected by the selection means.

* * * * *